United States Patent
Eksten et al.

(10) Patent No.: US 9,535,669 B2
(45) Date of Patent: Jan. 3, 2017

(54) SYSTEMS AND METHODS FOR COMPUTING APPLICATIONS

(71) Applicant: IMAGINE COMMUNICATIONS CORP., Frisco, TX (US)

(72) Inventors: Brick Eksten, Uxbridge (CA); Craig White, Richmond Hill (CA); Scott Palmer, Stouffville (CA); Frank Belme, Stouffville (CA); Stephen Li, Markham (CA); Cristian Saceanu, Thornhill (CA)

(73) Assignee: IMAGINE COMMUNICATIONS CORP., Frisco, TX (US)

( * ) Notice: Subject to any disclaimer, the term of this patent is extended or adjusted under 35 U.S.C. 154(b) by 0 days.

(21) Appl. No.: 14/837,670

(22) Filed: Aug. 27, 2015

(65) Prior Publication Data
US 2016/0048388 A1    Feb. 18, 2016

Related U.S. Application Data

(63) Continuation of application No. 14/343,299, filed as application No. PCT/CA2012/000820 on Sep. 6, 2012, now Pat. No. 9,152,470.
(Continued)

(51) Int. Cl.
| | |
|---|---|
| *G06F 9/44* | (2006.01) |
| *G06F 9/50* | (2006.01) |
| *G06F 9/445* | (2006.01) |
| *G06F 21/10* | (2013.01) |
| *H04L 29/06* | (2006.01) |

(52) U.S. Cl.
CPC . *G06F 8/34* (2013.01); *G06F 8/20* (2013.01); *G06F 8/36* (2013.01); *G06F 8/60* (2013.01); *G06F 8/70* (2013.01); *G06F 9/44521* (2013.01); *G06F 9/5066* (2013.01); *G06F 21/105* (2013.01);
(Continued)

(58) Field of Classification Search
CPC .. H04L 9/3213; G06F 9/44505; G06F 9/5072; G06F 9/45533; G06F 89/20; G06F 89/34; G06F 89/36
See application file for complete search history.

(56) References Cited

U.S. PATENT DOCUMENTS

| | | |
|---|---|---|
| 5,815,689 A | 9/1998 | Shaw et al. |
| 6,073,111 A | 6/2000 | Leymann et al. |

(Continued)

FOREIGN PATENT DOCUMENTS

EP    1492000 A2    12/2004

OTHER PUBLICATIONS

Dinh K. Nguyen, "Foundations of Blueprint for Cloud-based Service Engineering" 2011, p. 1-24 <Foundations_blueprint.pdf>.*
(Continued)

*Primary Examiner* — Tuan Vu
(74) *Attorney, Agent, or Firm* — Norton Rose Fulbright Canada LLP; Maya Mederios

(57) ABSTRACT

Systems and methods for dynamic development and/or deployment of computing applications including a development framework, a visual design subsystem, and a deployment subsystem, where at runtime the deployment subsystem is operable to dynamically deploy a computing application realized by a blueprint by sending a request at runtime for graphs and components instantiated by the blueprint.

21 Claims, 21 Drawing Sheets

Related U.S. Application Data

(60) Provisional application No. 61/531,953, filed on Sep. 7, 2011, provisional application No. 61/598,670, filed on Feb. 14, 2012.

(52) U.S. Cl.
CPC ....... *G06F 2221/0773* (2013.01); *H04L 63/08* (2013.01)

(56) References Cited

U.S. PATENT DOCUMENTS

| | | | |
|---|---|---|---|
| 6,725,279 | B1 | 4/2004 | Richter et al. |
| 7,900,140 | B2 | 3/2011 | Mohammed et al. |
| 7,937,487 | B2 | 5/2011 | Dunbar et al. |
| 7,962,639 | B2 | 6/2011 | Dunbar et al. |
| 8,015,541 | B1 | 9/2011 | Srinivasan et al. |
| 2009/0254572 | A1 | 10/2009 | Redlich et al. |
| 2010/0250730 | A1 | 9/2010 | Menzies et al. |
| 2010/0299763 | A1 | 11/2010 | Marcus et al. |
| 2011/0126047 | A1* | 5/2011 | Anderson ............ H04L 9/3213 714/15 |
| 2011/0126197 | A1* | 5/2011 | Larsen ................. H04L 9/3213 718/1 |
| 2011/0126207 | A1* | 5/2011 | Wipfel ................. H04L 9/3213 718/104 |
| 2011/0179134 | A1 | 7/2011 | Mayo et al. |
| 2011/0238458 | A1 | 9/2011 | Purcell et al. |
| 2011/0296021 | A1* | 12/2011 | Dorai .................... G06F 9/5072 709/226 |
| 2011/0321033 | A1* | 12/2011 | Kelkar ................. G06F 9/44505 717/174 |
| 2012/0102171 | A1* | 4/2012 | Bhatt .................. G06F 9/45533 709/223 |
| 2012/0246317 | A1* | 9/2012 | Eriksson .............. G06F 9/5072 709/226 |
| 2013/0239089 | A1 | 9/2013 | Eksten et al. |

OTHER PUBLICATIONS

Patent Cooperation Treaty, Written Opinion and International Search Report dated Dec. 20, 2012, issued on PCT Application No. PCT/CA2012/000820.

Microsoft, "About DirectShow Filters", Build date: May 3, 2011, accessed at http://msdn.microsoft.com/en-us/library/dd373390.

Microsoft, "DirectShow System Overview", Build date: May 3, 2011, accessed at http://msdn.microsoft.com/en-us/library/dd375470.

MSDN Magazine, "DirectShow: Core Media Technology in Windows XP Empowers You to Create Custom Audio/Video Processing Components", Jul. 2002 Issue, accessed at http://msdn.microsoft.com/en-us/magazine/cc301631.aspx.

European Patent Office, Search Report dated Feb. 19, 2015, issued on European Patent Application No. 12830465.6.

Intellectual Property Office of New Zealand, Office Action dated Aug. 4, 2014, issued on New Zealand Patent Application No. 623020.

Intellectual Property Office of New Zealand, Office Action dated Oct. 30, 2014, issued on New Zealand Patent Application No. 623020.

Nguyen, Dinh K., Foundations of Blueprint for Cloud-based Service Engineering, Jun. 2011, ISSN 0924-7815, p. 1-2.

\* cited by examiner

Fig. 8

SYSTEMS AND METHODS FOR COMPUTING APPLICATIONS

CROSS-REFERENCE TO RELATED APPLICATIONS

This application is a continuation of U.S. patent application Ser. No. 14/343,299 filed Apr. 24, 2014 which is a National Phase Entry of PCT application PCT/CA2012/000820 filed Sep. 6, 2012 which claims the benefit of U.S. Provisional Patent Application No. 61/531,953 filed Sep. 7, 2011 and U.S. Provisional Patent Application No. 61/598,670 filed Feb. 14, 2012 all of which are hereby incorporated by reference in their entireties.

FIELD

The described embodiments relate to systems and methods for computing applications, and in particular, to systems and methods for dynamic development and deployment of computing applications.

BACKGROUND

Computing applications generally involve processing data, performing operations on the data to carry out specific functions, completing tasks, controlling components, and so on. An example computing application is a media application. Media applications generally involve producing, transforming or delivering media data, or a combination thereof. New devices and technology increase the use of computing applications and data. New network capabilities and improved data access further increase the use of computing applications and data. The availability of multiple computing languages, protocols and platforms increase options available to computing application providers, developers, and users but may make it difficult to use a combination of multiple computing applications or combine a new computing application with an existing system or architecture due to integration, interoperability and connectivity problems. There exists a need for improved methods and systems for the development and deployment of computing applications, or at least alternatives.

SUMMARY

In a first aspect, embodiments described herein provide a system for dynamic development of computing applications comprising a development framework, one or more processors, and a memory coupled to the one or more processor and configured to store instructions executable by the one or more processors to configure the development framework to define components and graphs, wherein each component defines a computing processing mechanism for processing data containers of computing data at application runtime, wherein each graph identifies components, connections between the components, and properties for the components, wherein a graph is an instantiation of a corresponding blueprint at application runtime, wherein the development framework enables components to be embedded within other components. Additional and alternative functionality is described herein.

In accordance with some embodiments, a graph may deliver functionality defined by the components identified by the graph, and wherein a blueprint connects the functionality to a running environment. The blueprint may provide business logic for the corresponding graph.

In accordance with some embodiments, the system may further comprise a visual design subsystem for realizing computing applications, wherein the visual design subsystem is operable to arrange components into functional blocks, define specific orders of operation for the functional blocks, and define connections between the functional blocks to instantiate the computing applications. Additional and alternative functionality is described herein.

In accordance with some embodiments, each component may be associated with one or more versions, wherein at least one of a graph and a blueprint comprises a reference to a solution set of components, wherein the solution set identifies a version for each component.

In accordance with some embodiments, at least one component may be associated with one or more versions and wherein the development framework enables loading of an appropriate version of the at least one component at application runtime.

In accordance with some embodiments, a first component may be in a first language and a second component may be in a second different language, wherein the first and second components comprise data and are operable to access the memory and data structures, and wherein the system further comprises a translation module operable to translate multiple languages into a common language by translating the first and second component data and how the first and second component re operable to access the memory and the data structures.

In another aspect, embodiments described herein may provide a method for dynamic development of computing applications: providing a dynamic development of computing applications comprising a development framework, one or more processors, and a memory coupled to the one or more processor and configured to store instructions executable by the one or more processors to configure the development framework to define components and graphs, wherein each component defines a computing processing mechanism for processing data containers of computing data at application runtime, wherein each graph identifies components, connections between the components, and properties for the components, wherein a graph is instantiated by a corresponding blueprint at application runtime; wherein the development framework enables components to be embedded within other components; developing components and graphs for a blueprint; and storing the components and the graphs for the blueprint in the repository for loading at application runtime.

In another aspect, embodiments described herein may provide a system for dynamic deployment of computing applications comprising: a deployment subsystem for deploying computing applications at runtime, one or more processors, and a memory coupled to the one or more processor and configured to store instructions executable by the one or more processors to configure the deployment subsystem with a repository, cloud agent, cloud engine, wherein the computing applications are realized by blueprints, wherein each blueprint may be used to instantiate a graph at application runtime, wherein a graph identifies components, connections between the components, and properties for the components, wherein each component defines a computing processing mechanism for processing data containers of computing data at application runtime, wherein each graph identifies components, wherein the repository stores the graphs and the components for loading at application runtime, wherein the cloud agent controls at least one cloud engine, wherein the cloud engine provides a running environment for the computing application by using blueprints to instantiate graphs at application runtime; wherein at runtime the deployment subsystem dynamically constructs and deploys a computing application by sending a request at runtime to the repository for the graphs instantiate by corresponding blueprints and components identified therein. Additional and alternative functionality is described herein.

In accordance with some embodiments, each component may be associated with one or more versions, wherein at least one of a blueprint and a graph comprises a reference to a solution set of components, wherein the solution set identifies a version for each component.

In accordance with some embodiments, the system may further comprise a license server, wherein the license server may dynamically manage licenses and associates licenses with components and graphs, wherein use of components and graphs at application runtime requires the appropriate license.

In accordance with some embodiments, the system may further comprise a job manager, wherein the job manager dispatches blueprints and graphs to cloud agents based on available licenses managed by the license server. The job manager may also be configured to provide job and cloud engine dispatch, failover, tracking and reporting.

In accordance with some embodiments, the system may further comprise a security manager, wherein the security manager provides for secure connections and communications between system components. Additional and alternative functionality is described herein.

In accordance with some embodiments, each graph identifies components, connections between the components, and properties for the components, wherein components are connected by different types of pins.

In accordance with some embodiments, a data container defines a data type and a data object, wherein the data type is metadata describing the data container and the data object maintains raw data.

In accordance with some embodiments, the repository manages versioning of components and graphs to keep track of updates made thereto, wherein the repository serves the components and graphs at application runtime using appropriate versions of the graphs and components. Additional and alternative functionality is described herein.

In accordance with some embodiments, the cloud agent is provided to each user system to manage the local resources of the user system, wherein the cloud agents interact with cloud engines to instantiate graphs using blueprints. Additional and alternative functionality is described herein.

In accordance with some embodiments, the system may further comprise a normalization module operable to receive input data files and convert and parse the input data files into data containers for processing by a graph.

In accordance with some embodiments, the system may further comprise code signing module operable to digitally sign each component to associate a developer, license, or both with at least one component. Additional and alternative functionality is described herein.

In accordance with some embodiments, the system may further comprise a digital certificate associated with a component provider subsystem, wherein the component provider subsystem provides one or more components; a digital certificate associated with a user computing subsystem, wherein the user computing subsystem is associated with a computing application, wherein the computing application involves a component provided by the component provider computing system; a license server configured to digitally sign a component by linking the component to the digital certificate associated with the user computing subsystem and the digital certificate associated with the component provider subsystem to indicate that the user computing system and the component provider subsystem accept performance of the digitally signed component; wherein at runtime prior to deploying each component the deployment subsystem queries the license server to determine whether the component is linked to the digital certificate associated with the user computing subsystem and the digital certificate associated with the component provider subsystem.

In accordance with some embodiments, the deployment subsystem may be further configured to partition a graph into two or more subgraphs and handle interprocess communications between the two or more subgraphs.

In another aspect, embodiments described herein may provide a method for dynamic deployment of computing applications: providing a deployment subsystem for deploying computing applications at runtime, one or more processors, and a memory coupled to the one or more processor and configured to store instructions executable by the one or more processors to configure the deployment subsystem to comprise a repository, cloud agent, cloud engine, wherein the computing applications identify blueprints, wherein each blueprint may be used to instantiate a graph at application runtime, wherein a graph identifies components, connections between the components, and properties for the components, wherein each component defines a computing processing mechanism for processing data containers of computing data at application runtime, wherein each graph identifies components; storing components and graphs in the repository for loading at application runtime; providing, by the cloud engine, a running environment for the computing application by using blueprints to instantiate graphs at application runtime; controlling, by the cloud agent, the cloud engine; at application runtime, dynamically deploying a computing application by sending a request at runtime to the repository for the graphs and components identified in the blueprint.

In accordance with some embodiments, the method may further comprise providing a digital certificate associated with a component provider subsystem, wherein the component provider subsystem provides one or more components; providing a digital certificate associated with a user computing subsystem, wherein the user computing subsystem is associated with a computing application, wherein the computing application involves a component provided by the component provider computing system; providing a license server configured to digitally sign a component by linking the component to the digital certificate associated with the user computing subsystem and the digital certificate associated with the component provider subsystem to indicate that the user computing system and the component provider subsystem accept performance of the digitally signed component; receiving, at a license server, acceptance of the component provided by the component provider subsystem in the computing application associated with user computing system by receiving the digital certificate from the user computing subsystem and the digital certificate from the component provider computing system; linking, at the license server, the component provided by the component provider subsystem in the computing application associated with user computing system to the digital certificate from the user computing subsystem and the digital certificate from the component provider computing system; and at application runtime prior to deploying each component, querying the license server to determine whether the component is linked to the digital certificate associated with the user computing subsystem and the digital certificate associated with the component provider subsystem.

In another aspect, some embodiments described herein provide a system for dynamic development and deployment of computing applications (such as e.g. a media application) comprising: a development framework comprising a software development kit, components, data containers, pins, and graphs, wherein the software development kit is used to define components, graphs, data containers, and blueprints. Each component may define a computer processing mechanism for processing data containers at application runtime. Each graph may be a template of a set of components, and each blueprint may be an embodiment of a graph; a visual design subsystem configured to output graphs and blueprints to develop computing applications using components, compound components and other graphs, wherein the visual design subsystem is operable to arrange components into functional blocks and define specific orders of operation for the functional blocks; a deployment subsystem for deploying computing applications at runtime comprising a repository, cloud agent, and cloud engine. The computing applications identify graphs, blueprints compound components, and components. The repository is configured to store graphs and components for loading at application runtime. The cloud engine provides a running environment for graphs and executes graphs at application runtime to instantiate computing applications. The cloud agent may control and manage the cloud engine. At runtime the deployment subsystem may dynamically construct and deploy a computing application by sending a request at runtime to the repository for the graphs, compound components, and components identified in the computing application. The deployment subsystem is operable to deploy a computing application by, at runtime, retrieving, transferring, downloading, and so on, the graphs, blueprints, etc. from the repository. The components, graphs, blueprints may not be present in the computing application and they may be pulled dynamically to create the computing application at runtime. They may also pre-exist locally due to previous availability (cache) or through user intent (e.g. a job manager persists the availability because the job is going to repeat).

In accordance with some embodiments, the deployment subsystem may further comprise a license server which may dynamically manage licenses and associate licenses with components and graphs. Use of components and graphs identified in a computing application requires the appropriate license.

In accordance with some embodiments, the deployment subsystem may further comprise a job manager, which dispatches cloud engines based on available licenses managed by the license server.

In accordance with some embodiments, the deployment subsystem may further comprise a security manager which provides for secure connections and communications between system components.

In accordance with some embodiments, the deployment subsystem may further comprise a job manager configured to provide job and engine dispatch, failover, tracking and reporting. The job manager may also be configured to provide the highest level of access to the running cloud engines, and provide centralized access to the cloud engines regardless of state (running or not). The job manager may further self-extend interfaces (e.g. web services) based on the graph/blueprint that is loaded on the cloud engine to provide a namespace (similar to the web) which may allow the developer to discover which graphs/components are used in that particular application, query/set parameters, and so on.

In accordance with some embodiments, a graph may define a set of components, where components in the set are connected by different types of pins.

In accordance with some embodiments, a data container may define a data type and a data object, wherein the data type is metadata describing the container and the data object maintains raw data.

In accordance with some embodiments, the repository is operable to manage versioning of components and graphs to keep track of updates made thereto. The repository serves the components and graphs at application runtime using appropriate versions of the graphs and components.

In accordance with some embodiments, the cloud agent is provided to each user system to manage the local resources of the user system. The cloud agents interact with cloud engines to execute graphs in order to run computing applications.

In accordance with some embodiments, the system may further comprise a normalization module operable to receive input files and convert and parse the input files into data containers to be processed by a graph.

In accordance with some embodiments, the system may further comprise a code signing module operable to digitally sign each component to associate a developer/license with each component.

In accordance with some embodiments, the system may further comprise a translation module operable to translate multiple languages into a common language for system.

In accordance with another aspect, embodiments may provide a method for dynamic development and deployment of computing applications (such as media applications, for example) comprising: providing a development framework comprising a software development kit, components, data containers, pins, and graphs. The software development kit may be used to define the components, graphs, and data containers. Each component may define a computer processing mechanism for processing data containers of media data at application runtime. Each graph may define a set of components, along with specific connections between the components and properties for the components; providing a visual design subsystem to define and output graphs, wherein graphs may be used to realize and create computing applications; using the visual design subsystem to arrange components into functional blocks and define specific orders of operation for the functional blocks, including connections between the functional blocks; providing a deployment subsystem for deploying computing applications at runtime comprising a repository, cloud agent, and a cloud engine. The computing applications may identify graphs, compound components, and components. The cloud engine may provide a running environment for graphs and executes graphs at application runtime to instantiate computing applications. The cloud agent controls the cloud engine; storing components and graphs output by the visual design subsystem in the repository for loading at application runtime; and at application runtime, dynamically constructing and deploying a computing application by sending a request at runtime to the repository for the graphs, compound components, and components identified in the computing applications.

In another aspect, embodiments described herein provide a system for dynamic development and deployment of computing applications comprising: a development framework comprising a software development kit, components, data containers, pins, and graphs. The software development kit may be used for defining the components, graphs, blue prints, and data containers. Each component may define a media processing mechanism for processing data containers of computing data at application runtime. Each component may be associated with one or more versions. Each graph may be a template identifying components and used to generate a corresponding blueprint. A blueprint may be a final embodiment of the graph and may comprise a reference to a solution set of components, where the solution set of components may identify a version for each component; a visual design subsystem configured to define and output graphs in order to realize and create computing applications. The visual design subsystem may be operable to arrange components into functional blocks and define specific orders of operation for the functional blocks, including connections between the functional blocks. The visual design subsystem may be further configured to define a solution set of components by identifying a version of each component; a deployment subsystem for deploying computing applications at runtime comprising a repository, one or more cloud agents, and one or more cloud engines. The computing applications identify graphs, compound components, and components. The repository may be configured to store graphs, blueprints and components for loading at application runtime. The cloud engine may provide a running environment for graphs and may execute blueprints of the graphs at application runtime to instantiate computing applications. The cloud agent may be operable to control the cloud engine; wherein at runtime the deployment subsystem dynamically constructs and deploys a computing application by sending a request at runtime to the repository for the graphs, blueprints, compound components, and components, including appropriate versions thereof, identified in the computing applications.

In a further aspect, embodiments described herein provide method for dynamic development and deployment of computing applications: providing a development framework comprising a software development kit, components, data containers, pins, and graphs. The software development kit may define components, graphs, blueprints, and data containers. Each component may define a computer processing mechanism for processing data containers of computing data at application runtime. Each component is associated with one or more versions. Each graph may be a template identifying components and may be used to generate a corresponding blueprint. A blueprint may be a final embodiment of the graph and may comprise a reference to a solution set of components, where the solution set of components identifies a version for each component; providing a visual design subsystem for defining and outputting graphs in order to develop media applications, and for defining a solution set of components by identifying a version of each component; using the visual design subsystem to define a graph by arranging components into functional blocks and defining specific orders of operation for the functional blocks, including connections between the functional blocks, where the graph references a solution set of components; using the visual design subsystem to define a solution set of components referenced by the graph by receiving a selected version for each component in the solution set of components; providing a deployment subsystem for deploying computing applications at runtime comprising a repository, one or more cloud agents, and one or more cloud engines. The media applications identify graphs, compound components, and components. The cloud engine provides a running environment for graph and executes blueprints of the graphs at application runtime to instantiate computing applications The cloud agent may be operable to control the cloud engine; storing components and graphs output by the visual design subsystem in the repository for loading at application runtime; and at application runtime, dynamically constructing and deploying a computing application by sending a request at runtime to the repository for the graphs, compound components, and components, including appropriate versions thereof identified in the computing application.

In another aspect, embodiments described herein provide a system for dynamic development and deployment of computing applications comprising: a development framework comprising a software development kit, components, data containers, pins, and graphs. The software development kit may be for defining the components, graphs, blue prints, data containers. Each component may define a media processing mechanism for processing data containers of computing data at application runtime. Each graph may be a template identifying components and may be used to generate a corresponding blueprint. A blueprint may be a final embodiment of a graph, and a graph is the instantiation of a corresponding blueprint at application runtime; a digital certificate associated with a component provider subsystem, where the component provider subsystem provides one or more components of the development framework; a digital certificate associated with user computing subsystem, where the user computing subsystem is associated with a computing application, where the computing application involves a component provided by the component provider computing system; a visual design subsystem configured to define and output graphs in order to develop computing applications, where the visual design subsystem is operable to arrange components into functional blocks and define specific orders of operation for the functional blocks; a deployment subsystem for deploying computing applications at runtime comprising a repository, one or more cloud agents, and one or more cloud engines. The computing applications identify graphs, compound components, and components. The repository may be configured to store graphs and components for loading at application runtime. The cloud engine may provide a running environment for graph and may execute blueprints of the graphs at application runtime to instantiate computing applications. The cloud agent is operable to control one or more cloud engines. The deployment subsystem may further comprise a license server configured to digitally sign a component by linking the component to the digital certificate associated with the user computing subsystem and the digital certificate associated with the component provider subsystem to indicate that the user computing system and the component provider subsystem accept performance or conformity of the digitally signed component, where performance may relate to runtime performance, service level agreement, and other measures of performance; wherein at runtime the deployment subsystem dynamically constructs and deploys a computing application by sending a request at runtime to the repository for the graphs, blueprints, compound components, and components identified in the computing applications. Prior to deploying each component, the deployment subsystem may query the license server to determine whether a component is linked to a digital certificate associated with the user computing subsystem and the digital certificate associated with the component provider subsystem.

In a further aspect, embodiments described herein provide a method for dynamic development and deployment of computing applications comprising: providing a development framework comprising a software development kit, components, data containers, pins, and graphs. The software development kit may define components, graphs, blueprints, and data containers. Each component may define a computing processing mechanism for processing data containers of computing data at application runtime. Each component may be associated with one or more versions and each graph may be a template identifying components and may be used to generate a corresponding blueprint. A blueprint may be a final embodiment of a graph, and a blueprint may be used to instantiate a graph at application runtime; providing a digital certificate to a component provider computing system, where the component provider computing system provides one or more components to the development framework; providing a digital certificate to a user computing subsystem, where the user computing subsystem is associated with a media application, and where the computing application involves a component provided by the component provider computing system; providing a visual design subsystem for defining and outputting graphs in order to develop computing applications, and for defining a solution set of components by identifying a version of each component; using the visual design subsystem to define a graph by arranging components into functional blocks and defining specific orders of operation for the functional blocks, where the graph may reference a solution set of components; providing a deployment subsystem for deploying computing applications at runtime comprising a repository, one or more cloud agents, and one or more cloud engines. The computing applications may identify graphs, compound components, and components. The cloud engine may provide a running environment for graphs and may execute blueprints of the graphs at application runtime to instantiate computing applications. The cloud agent is operable to control the cloud engine; receiving, at a license server, acceptance of the component provided by the component provider subsystem in the computing application associated with the user computing system by receiving the digital certificate from the user computing subsystem and the digital certificate from the component provider computing system; linking, at the license server, the component provided by the component provider subsystem in the computing application associated with user computing system to the digital certificate from the user computing subsystem and the digital certificate from the component provider computing system; storing components and graphs output by the visual design subsystem in the repository for loading at application runtime; and at application runtime, dynamically constructing and deploying the computing application associated with the user computing subsystem by sending a request at runtime to the repository for the graphs, compound components, and components identified in the computing application; and prior to deploying the component provided by the component provider computing system, querying the license server to determine whether the component is linked to the digital certificate associated with the user computing subsystem and the digital certificate associated with the component provider subsystem.

Variations and combinations may also be provided by the embodiments described herein. Additional aspects of various example embodiments are identified and described in the following description.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIG. 8 illustrates a block diagram of an example interface for a job manager in accordance with an example embodiment;

Figure 1A:
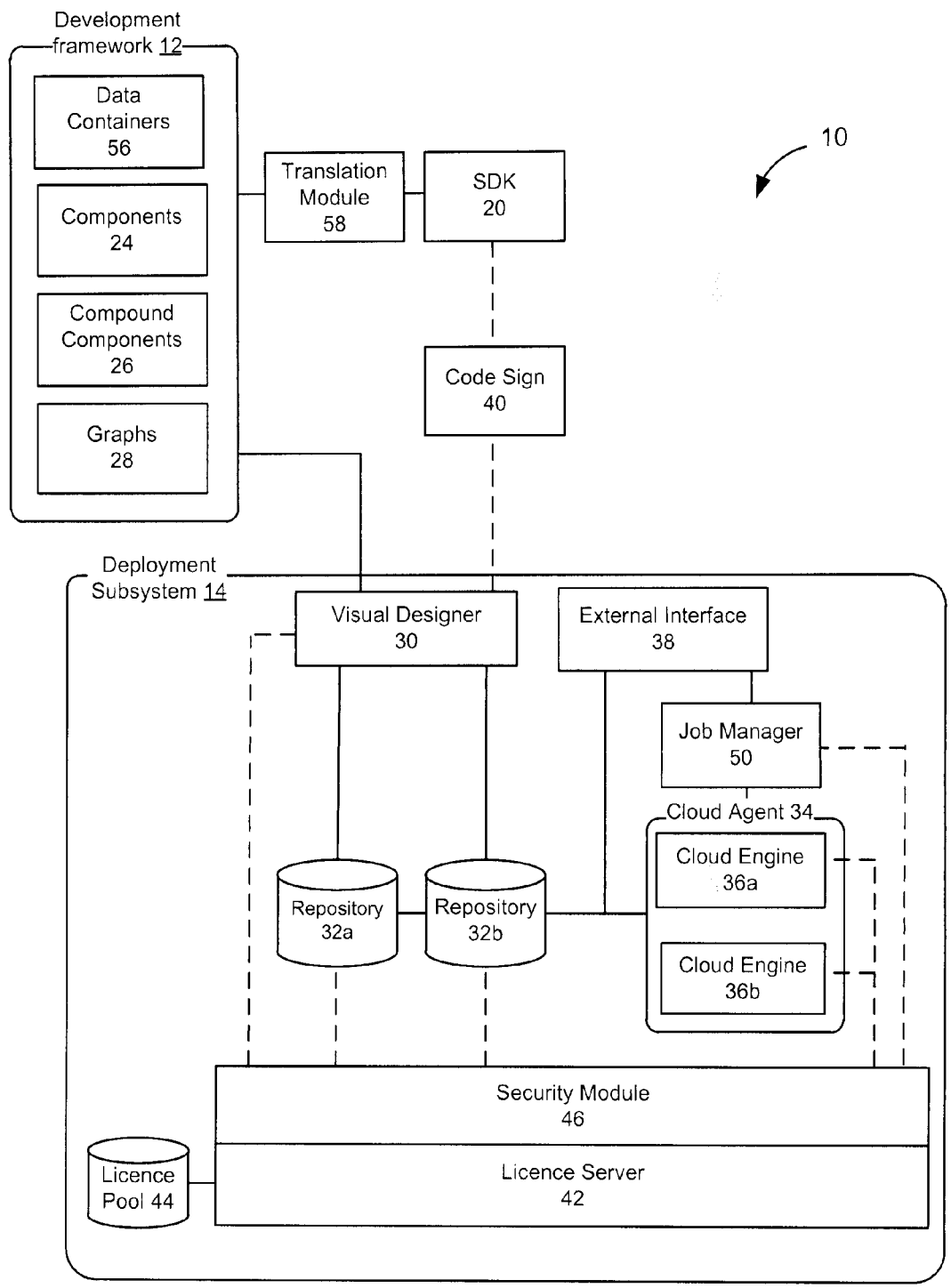
FIG. 1A illustrates a block diagram of the system for dynamic development and deployment of computing applications, in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as media applications, resource related applications, voting applications, user registration applications, integrity management applications, and so on. By way of illustrative example embodiments may be described herein in relation to media applications.

Referring now to FIG. 1A, there is shown a block diagram of a system 10 for dynamic development and/or deployment of computing applications in accordance with an example embodiment. By way of example, a computing application may be a media application. A media application may be a computing application designed to perform specific tasks and activities for manipulating media data using a combination of hardware and software computing components. For example, the media application may involve processing media data, performing operations on the data to carry out specific functions, completing tasks, controlling components, producing, transforming or delivering media data, or a combination thereof. The media application may generate a deliverable or transform a deliverable for provision to output devices and for generation of a discernable effect, such as by transforming received input media data into a deliverable, for example. The media application may process, transform and manipulate input data streams to generate a complete media program for display, broadcasting, distribution, and so on. For example, playback of the input data stream may be discernably different from playback of the deliverable generated or transformed by the media application.

The system 10 may scale from simple media applications run on a local computer to complex media applications deployed on a cloud computing system. A cloud computing system is operable to deliver computing services through shared resources, software and information over a network. The system 10 may be operable for multiple platforms (e.g. Windows, Linux, OS X) and multiple languages (e.g. C++, Java, Scripting), and may use standards based interfaces (e.g. SOAP, XML).

The system 10 may be implemented as a cloud computing system and may be accessible to users through an external interfaces layer 38 which may allow integration with existing processes, applications and systems. The system 10 may include a development framework 12 and a visual design subsystem 30 to define and output graphs 28 in order to develop media applications. The system 10 may include a deployment subsystem 14 for dynamically deploying media applications at runtime. The system 10 may provide a platform for building, developing and deploying professional workflow applications for desktop, networked and cloud based systems.

By way overview, the development framework 12 may be used for the development of component 24 and workflow (e.g. graphs 28, blueprints 28a) technologies. The repository 32 may provide a centralized pool of component 24 technologies and workflow blueprints 28a and may act as both the warehouse and supply chain (for syncing upstream/downstream repositories 32). The visual designer may be used to design and test workflow graphs 28 and blueprints 28a. A license server 42 may control authorization of component technologies. The system 10 may provide one or more of the following features: multi-platform support through the framework SDK 20; multi-language support allows native development in multiple languages such as C++, Java, and scripting languages; support for flexible workflow models with inline, parallel, and staged execution of individual processes; consistent management interfaces through standards based web services regardless of workflow complexity or scope; dynamic scalability allows for simple and complex solutions to easily scale to large volume processing capabilities with low provision and deployment costs. Other features may also be provided by system 10 as described herein.

The system 10 may enable decomposition of hardware and software problems into their core elements. These core elements may be referred to as components 24. By breaking down multiple problems, a catalog of components 24 may be developed that can be brought together in different ways (e.g. by graphs 28, blueprints 28a) to solve new problems. For example, a user may want to perform video compression and send email notification upon completion. These two problems are very different but by combining elements of the video compression problems, that is, components 24 for video codec, multiplexer and file writer; and the email problem, that is, components 24 for database lookup, report generator and email engine; system 10 can combine the two into a complete solution that not only performs the core video compression, but may also sends out notification emails to the users who need to be notified of the project completion.

The system 10 may enable registration of the components 24 into a repository 32 of technology, used to store, manage, and access these technologies in a controlled environment that may be centralized or distributed. The system 10 may allow these repositories 32 to be chained together into managed supply chains, where downstream repositories 32 can be synced with upstream repositories 32.

The system 10 may control access to components 24 using a floating license server 42 which may check out licenses when components 24 are being used.

The system 10 may provide a communication/management bridge between a higher level application and the cloud engines 36a which run jobs. The cloud agents 34 may provide that bridge. The cloud agents 34 may provide a consistent web services integration and management point regardless of the complexity of the solution.

The system 10 may provide a method for creating workflow solutions (graphs 28, blueprints 28a) from components 24. The visual designer 30 may be implemented as a visual design tool which allows new solutions to be created, tested, and saved as graphs 28 or blueprints 28a that can be referenced by an application. Blueprints 28a can also be stored in the repository 32, becoming part of the managed supply chain.

The system 10 may run cloud engines 36 to execute jobs. When the application sends a command to the cloud agent 34 to run a job, the cloud agent 34 determines which components are required to start running the solution and acquires those components from the repository 32. For example, the cloud agent 34 creates the cloud engine 36a, the cloud engine 36a loads the graph 28 or blueprint 28a, acquires the required licenses from the license server 42, and runs the job. The cloud engine 36a may dynamically acquire new component licenses on the fly as required by the currently running workflow. When the job is complete the licenses are returned to the pool of licenses managed by the license server 42.

Development Framework

The development framework 12 may include components 24, compound components 26 (components embedded within other components), data containers 56, graphs 28, and blueprints 28a. The development framework 12 may be accessible through a software development kit (SDK) 20, web services or by using the visual design subsystem 30. Both the SDK 20 and the visual design subsystem 30 may be used to develop components 24, compound components 26, and graphs 28, and to define new data types to define new data containers 56. System 10 may provide a graph-based processing engine, where graphs 28 are made up of reusable components 24 with discrete processing functions. The system 10 may also provide the framework for development and deployment of graphs 28 and components 24. As noted above, the development framework 12 may be accessible through web services, where a user may create graphs and components using the web services application programming interface.

As noted, the SDK 20 may be used to define components 24, graphs 28, data containers 56, and other features of the system 10. The SDK 20 may be language independent. An example of the SDK 20 in Java is:

```
public class LoggingComponent extends JavaComponent {
    @Override
    public void process(DataContainer data, String inputPinName ) {
        super.process(data, inputPinName);
        log( Level.INFO, "Process: "+ data );
        getOutputPin( ).process(data);
    }
}
```

Other languages may also be used and this is an example only.

The SDK 20 may include a framework API and a component API.

The framework API may be used to create the graphs 28 used by an application, to control loading and executing graphs 28 and to provide status to the application.

The component API may be used to create individual components 24.

Separating the component API from the framework API may allow component developers to focus on the development of a component 24 without requiring knowledge about the logistics of the whole environment.

The SDK 20 may include application programming interface in multiple languages (such as java, C++ for example) to create components. Components may be created using one or more languages.

Components 24 are building blocks of the system 10. A component 24 is an object, plug in or set of software code that defines a processing mechanism and uses the SDK 20 to interact with the development framework 12. At application runtime, a component 24 is configured to process data flowing through the component 24 as a data container 56. Each component 24 may be a single component 24 or a compound component 26 built up of multiple embedded components 24. A component 24 may contain plug in files, and other files, such as jar files, dlls, and so on.

Figure 2:
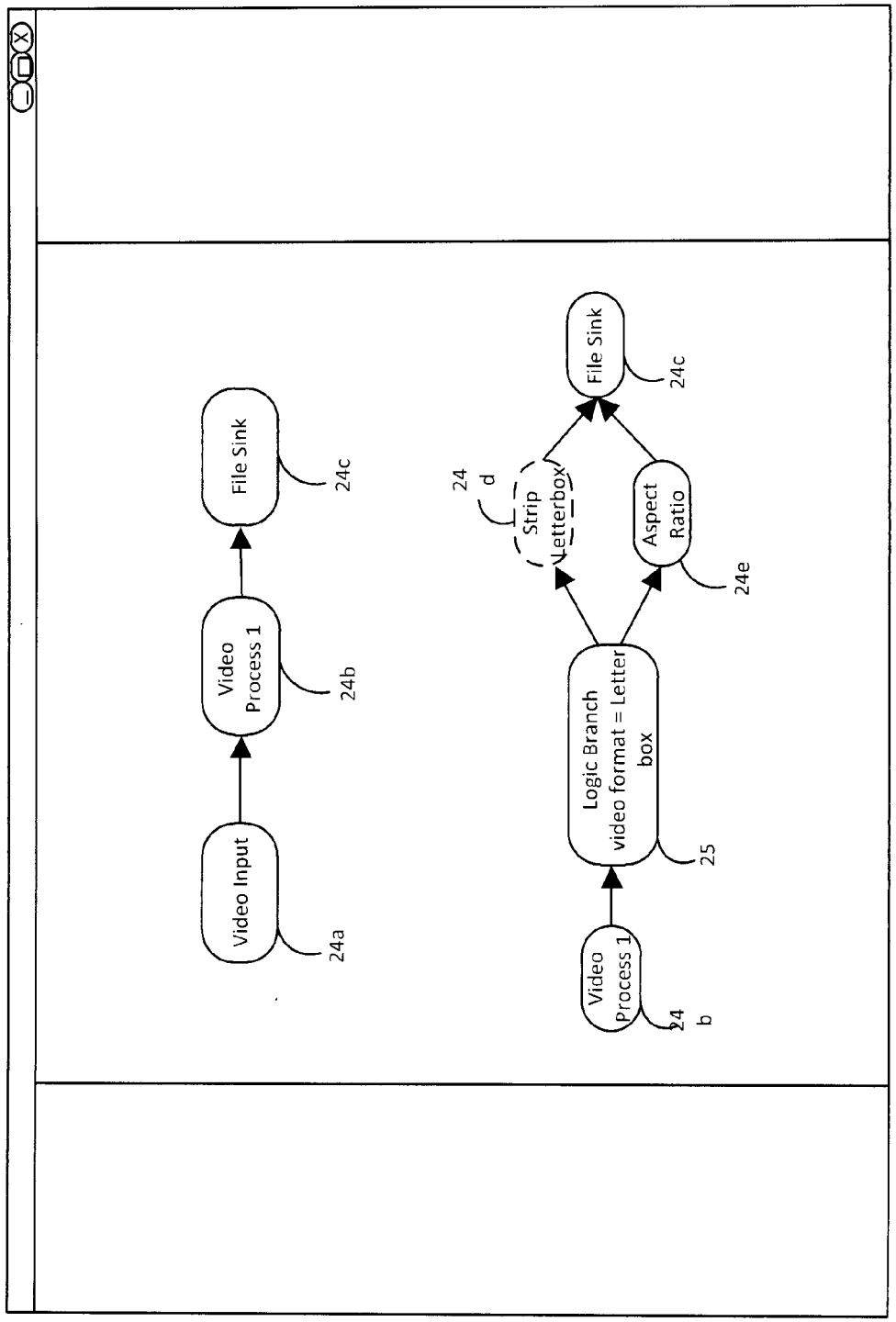
FIG. 2 illustrates a block diagram of example components in accordance with an example embodiment.
Figure 5:
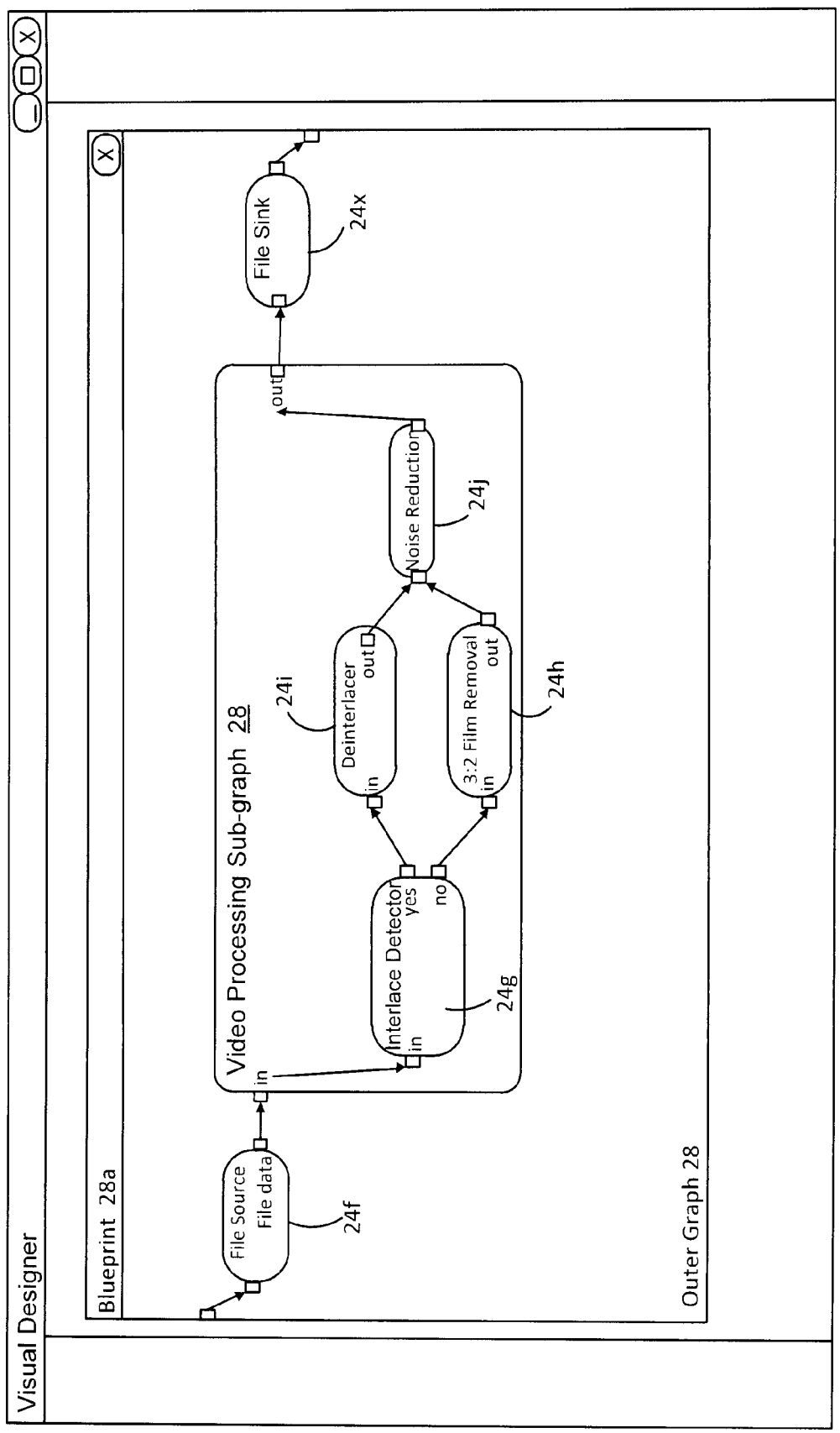
FIG. 5 illustrates a block diagram of an example graph in accordance with an example embodiment.
Figure 6:
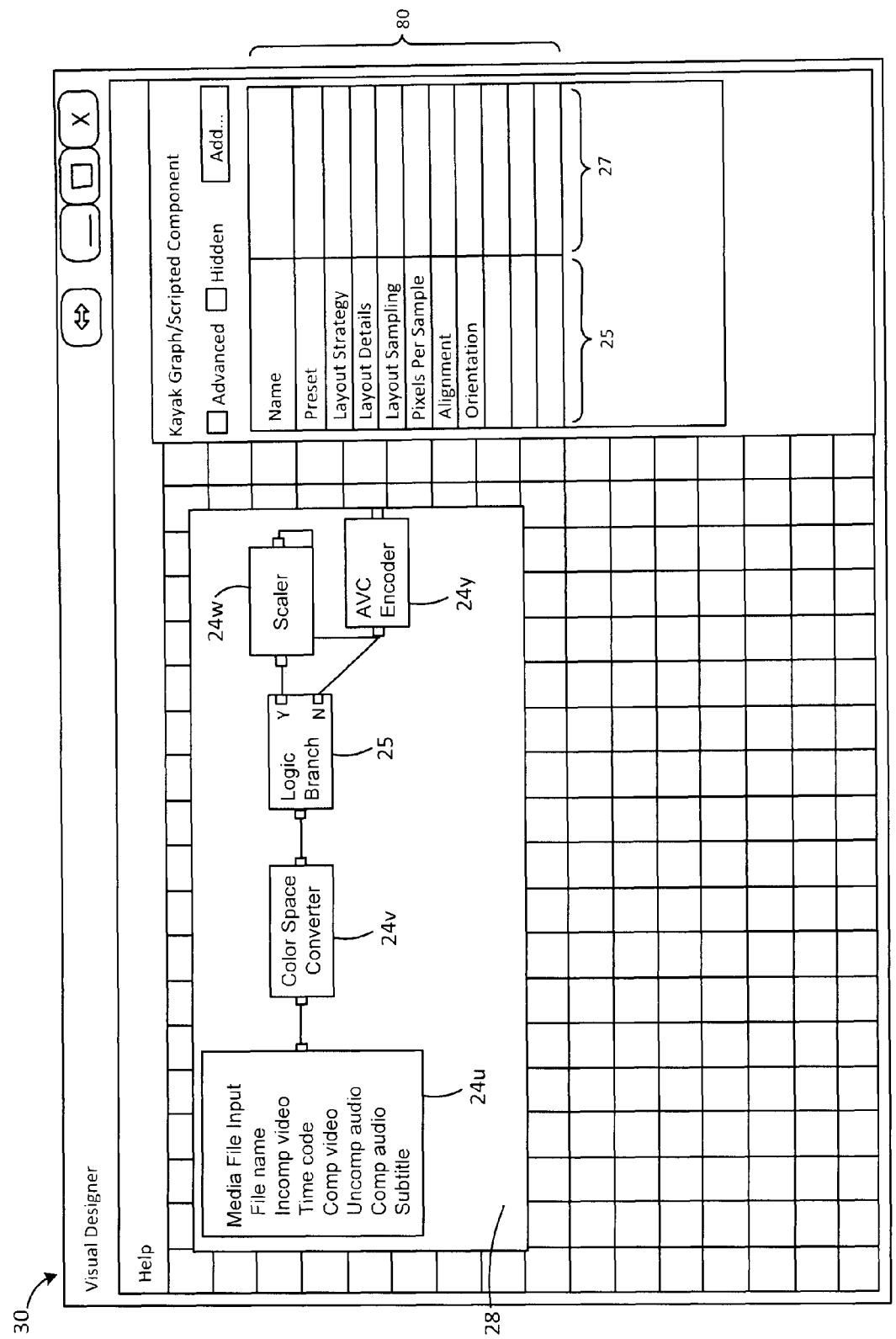
FIG. 6 illustrates a block diagram of an example interface for a visual design subsystem in accordance with an example embodiment.

Referring now to FIG. 2 there is shown a block diagram of example components 24 in accordance with an example embodiment. Examples of components 24 for a media application context include video input 24a, video process 24b, file sink 24c, logic branch 25 (decisioning and routing based on criteria, such as for example video format), strip letterbox 24d, and aspect ratio 24e. Other examples of components 24 are shown in FIGS. 5 and 6, such as file source 24f, interlace detector 24g, film removal 24h, deinterlacer 24i, noise reduction 24j, buffer 24k, file sink 24x, YUV to RGB 24m, image converter 24n, flow control 24o, file input 24u, color space converter 24v, scaler 24w, and AVC encoder 24y.

Figure 3:
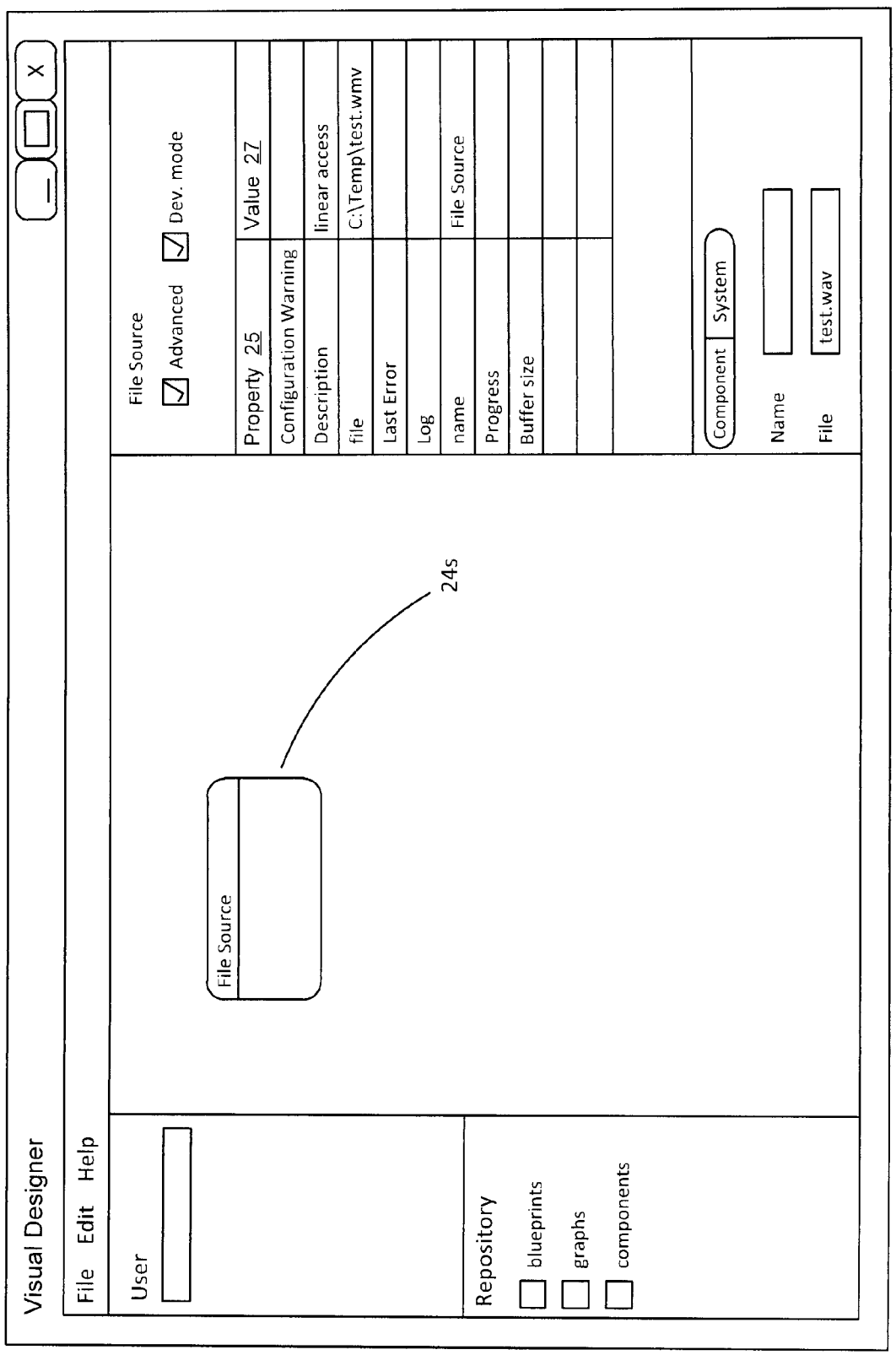
FIG. 3 illustrates a block diagram of example properties of an example component in accordance with an example embodiment.

Components 24 may have properties and values for those properties. A component's 24 properties configure its behavior. The properties provide runtime information, transient information, results, and so on. Referring now to FIG. 3 there is shown a table representing example properties 25 and values 27 of an example component 24 (file source 24s) in accordance with an example embodiment. Examples of properties 25 include description, configuration warning, default input pin, default output pin, description, file, name, last error, log, progress, read buffer size, and so on. Each property may have an associated value 27. A component's 24 properties 25 may be set and modified through the visual design subsystem 24 or other interface.

Properties modify the way a component 24 behaves, such as how it processes data or the type of output it produces. For instance, properties can be used to change the format of a component's 24 output or provide scaling information. Properties can be thought of as instance variables for components 24. Properties can be exposed to other components 24 through pins.

Property attributes may change the way a property is used, exposed and saved. They may be set in the property declaration in the plugin.xml file. For example, properties may have one or more of the following attributes: transient (when a graph is saved to file, property values may be saved with it by default, however, if a property is transient, its value may not be saved and the default value may be used when the graph is loaded from file), required (the property must be set for the component to run), hidden (the property is used internally by a component and may not be visible to a user), advanced (the property generally does not need to be modified by the user, but may be of interest to experienced users), interprocess (the property may be accessible to processes that are spawned by its graph), and so on.

Properties can be exposed on pins. A property exposed on a pin can be written to or read by another component. The name of a property pin is the same as the name of the property defined in the property declaration. The property pin's display name in the visual designer 30 may be the same as the property name unless a pin display name is provided. Properties may be declared within component definitions in the plugin file, such as a plugin .xml file for example.

Example attributes of properties may include property name, display name, description, required, advanced, hidden, transient, interprocess, value type, and initial value. A property may be defined as advanced if it generally does not need to be modified, but may be of interest to experienced users. For example, setting the attribute advanced="true" may hide the property in the visual designer 30. The property may become visible when an "advanced" box is selected in the visual designer 30. Setting hidden="true" may hide the property in the visual designer 30. The property may become visible when a "hidden" box is selected in the visual designer 30. When a graph is saved to file, the property values of its components may also be saved. Setting transient="true" may result in the property value not being saved. The default property value may be used when the graph is loaded from file. Setting interprocess="true" may make a property accessible to processes spawned by its graph. A property initial value may be the default value of the property when the component is initially instantiated.

Property values may be restricted. For example, property values may be restricted to strings, numbers, integers, range of numbers defined by a minimum and a maximum, and so on. Property value restriction attributes may include a minimum value, a maximum value, a list of enumerated values, data type for values, and so on.

An attribute property initial value may set the initial value of a property that has been declared elsewhere (for example, if a property has been declared in an inherited component, in the component's source code or in the framework itself). An example use of property initial value may be for instructing a C++ or dual Java/C++ component how to construct its native peer.

Components 24 may be language independent and may be developed by different developers in different languages, and used together to create a graph 28, blueprint 29 or compound component 26.

Each component 24 may have one or more versions. A version is a specific form or state of the component 24, and may reflect new developments or implementations of the component 24. Each version of a component 24 may be referenced using a version name or number. For example, each version may be assigned a number in increasing order. As will be explained herein in relation to FIG. 13, the system 10 maintains versioning to keep track of and use different versions of components 24 in graphs 28, blueprints 28a, and compound components 26. This may result in more flexible system 10 as different versions of the same component 24 may be usable by graphs, media applications and users, and each are not required to use the same component and version thereof.

Components 24 may be written for different architectures or contexts, such as 32 bit and 64 bit architectures. As will be explained herein, system 10 is operable to develop and deploy an application instance which combines components written for both 32 bit and 64 bit architectures. For example, system 10 is operable to detect whether a particular media application has been developed using both components 24 for 32 bit architectures and components 24 for 64 bit architectures. If so, system 10 is operable to create a separate process space or instance for each context and handle inter process communications using mapping and a shared memory. For example, the system 10 is operable to create a 32 bit architecture process instance and a 64 bit architecture process instance and manage communications between the process instances.

Further, components 24 may be self-contained and isolated from a dependency point of view. The entire dependency set of a component 24 may be self-contained, being specified and packaged in the component distribution unit (e.g. plugin). The component 24 dependencies may also be isolated, referring exclusively to the specific component 24 and version(s) they depend on. This may enable the system 10 to realize complex workflows while resolving components 24 dependencies without user intervention. Further, the dependency isolation may allow the system 10 to provide distinct behavior while executing blueprints built with the same components 24 by isolating the different versions of these components 24 and their dependencies.

Components 24 may have pins. Pins connect to pins on other components 24. Pins may be referenced by name. Pins may connect to multiple components 24, which may be referred to as branching. In accordance with some embodiments described herein, components 24 do not have to be of the same type to connect to the same pin.

There may be different types of pins. There may be input pins, such as an input push and input pull, which can be used to decouple components 24 with different fundamental architectures. A push pin pushes its output to the next pin and a pull pin calls for data on its input pin. The pin model controls the flow of data between components. There are output pins. There are control pins, including event (out), property (in/out), and command (in) pins.

Pins may be used to pass data between components 24. Pins may expose properties and events, and may be used to trigger commands. Static pins may be defined within the component 24 definition in the plugin.xml file and may be created every time a component 24 is instantiated. Dynamic pins may be defined within the component 24 source code and may be added after the component 24 has been instantiated.

Input and output pins may be defined as default pins. A default pin may not need to be referred to by name in the component source code. There may be only one default input pin and only one default output pin per component.

As noted herein, there may be different types of pins. For example, an OUTPUT_PUSH pin is a type of output pin. Data may be sent through an output pin to the next component's 24 input pin. INPUT_PUSH and INPUT_PULL are two different types of input pins. When using a push input pin, a component may process data as it arrives on the pin. When using a pull input pin, a component 24 may request data from the pin, blocking until data arrives. Pull input pins may be used in situations where there is more than one input pin on a component 24 and the data coming in through each pin needs to be controlled and coordinated. OUTPUT_IO and INPUT_IO pins are further examples. I/O pins act as both input and output pins and are typically used to pass data between graphs 28 or as output and input pins in compound components 24. A PROPERTY pin may expose a component's property so that it can be read or modified by other components 24. There may also be EVENT pins. When an event occurs, the data object generated by the event may be encapsulated in a Data Container 56 that may be pushed onto the event pin. If the event generates a null object, an empty Data Container 56 may be placed on the pin. The propagation of a Data Container 56 on an event pin signals that the event has occurred. COMMAND pins act as triggers to call commands on components. When a data container is placed on a command pin, the command is executed. The data on the data container may be used by the command, but it does not need to be.

Pins may set data types. For example, a data type feature may provide information to the end user about a component's expected input and output types. This may be useful at graph 28 design time to ensure the compatibility of connected components. Once the graph 28 starts, data types describing the actual data passing between components 24 may be used. A warning may be generated when incompatible pins are connected. The data type of a static pin may be set in the pin declaration using a data type definition name. The data type definition name may take the name of a data type definition, which is a set of key/value pairs that describe features such as image dimensions, audio format, and encoding format. For example, a pins data type for an input push pin may be set to integer.

The data type definition may be the default data type of an unconnected input pin. When components are connected, the input pin may acquire the data type of the output pin it is connected to. A component's 24 default output pin may acquire the data type of the component's default input pin unless the pins have been decorrelated. All other output pins may use their own data type definition names to set their data types.

A data type transform may be used to change the default output pin's data type. A data type transform may add or remove data type definitions from the output pin's acquired data type. Consider the following example where the default input pin is defined with a data type of integer. When the component is instantiated, the default input pin and the default output pin may both have the same data type, namely the "integer" data type. To change the default output pin's data type to string, a data type transform may be used to remove the "number" data type definition (of which Integer is a subtype) and add the string data type definition.

Data type restrictions may be used to provide more detail about what types of input a pin can accept. While setting a data type on a pin may act a simple data type restriction, setting a formal data type restriction on the pin can narrow down the type of data that is acceptable. Explicit data type restrictions may override the restriction implied by the pin's data type. Data type restrictions may be nested using logic operators (AND, OR, NOT). The syntax for data type restrictions may follow prefix notation. For example, say you want your pin to accept all numbers that are not integers: numbers AND (NOT integer), and in prefix notation this may be: AND number (NOT integer).

There may be a pin definition schema. A component's static pins may be declared in its definition. Static input, output, event, command and property pins may be declared in the component definition. In the case of event, command and property pins, the name of the pin may need to match the name of the event, command or property, respectively. A pin's data type may be defined in the plugin.xml file using a data type definition name, data type restrictions and data type transforms can also be set within the plugin.xml file.

A pin definition may include a name, type, default, data type, and display name. For a pin name, upon compiling the plugin.xml, a constant of the form PIN_<name> may be generated. The pin may be referenced in source code using this constant. For example, the constant PIN_file may be generated for a pin named "file". Input, output, event and command pins may be displayed on the component with this name in the visual designer 20. Property pins may have a different display name. The alternate display name may be set in the property declaration. Pins can be of type, INPUT_PUSH, INPUT_PULL, OUTPUT_PUSH, COMMAND, PROPERTY, OUTPUT_IO, INPUT_IO or EVENT. A default may be used with input or output pins. There may be only one default output pin and only one default input pin per component. Setting default to "true" may indicate that this pin is the default pin to use when referring to this type of pin. The data type definition may define the expected input or output data type. The pin data type may act as a data type restriction on an input pin. The display name may be the pin name displayed in the visual designer 30. If the display name is set on a property pin for which the defined property also has a display name, the pin display name may appear on the component and the property display name may appear as the property name.

A data type restriction may be used to restrict the type of input a pin can accept. When an output pin with a data type that does not meet the restriction conditions is connected to the pin, a warning may be generated. Data type restrictions may override restrictions based on the pin's defined data type. Data type restrictions may be combined using logic operators to create complex restrictions. The syntax of the data type restriction may follow prefix notation. Example restrictions include string, number, integer and so on. Logic operators AND, OR and NOT may be used to create complex data type restrictions.

A data type transform of a default output pin may be set by the default input pin's data type. If the default output pin will be producing output which is different than the input pin's data type, a data type transform may be used to change its data type. The data type transform may remove parts of a data type definition or entire definitions. It can also add data type definitions to a pin data type The set of components that represent a workflow may be saved as a graph 28. Data is encapsulated in data containers 56 that may be passed between connected components in a graph 28. Data containers 56 may consist of raw data as well as meta-information about the data.

Graphs 28 can be created, saved, and loaded programmatically or with the visual designer 30. The visual designer 30 is a visual design tool for creating, testing and saving workflows.

Workflows can be saved as graphs 28 or as blueprints 28a. Blueprints 28a are graphs 28 with attached meta-data. Graphs 28, blueprints 28a and components 24 may be registered into a repository 32 that is used to store, manage, and access components 24 and blueprints 28a in a controlled environment that may be centralized or distributed. Repositories 32 may be chained together into managed supply chains where downstream repositories 32 can be synced with upstream repositories 32.

Access to components 24 may be controlled through a floating license server 42. A component's 24 license may be checked out when it is being used.

Applications that use graphs 28 may submit their jobs to an agent 34, which may be a web service interface. The agent 34 may acquire the graph's 28 components 24 from the repository 32 and launch engines 36 to run the jobs. The engines 36 may load the graphs 28 or blueprints 28a, and may acquire the licenses needed to run the job. Once the job is complete, the licenses may be returned to the license server 42.

A component 24 development steps may include one or more of the following: designing the component 24 and its interface, including a determination of which features and elements the component 24 may need; saving the design that defines the component 24 in a file for use in graph 28, such as in a plugin.xml file, where the design of the component 24 may also include the features and elements of the component 24; writing and storing the component's 24 source code. Component definitions may be used to instantiate components 24 as a component 24 definition may contain all the information required to instantiate a component 24, including declarations for properties, commands, events and static pins.

Examples of properties may include a name, class name, unique identifier (such as a GUID for example), a description and a category. A component may be declared with a name, and an example of which is may be a Java class name and a unique GUID. Upon compiling the plugin.xml, a constant of the form NAME_<name> may be generated. The component's name may be referenced in source code using this constant. For example, the constant NAME_AudioMixer may be generated for a component named "AudioMixer".

The class name property may reference the component constructor class. For example, when writing a Java or Dual component, the component's Java class may be used, or when writing a C++ component, may use uniform NativeComponent class.

Each component may have a unique identifier which may be referred to as a GUID. The unique identifier may be for component licensing. For example, upon compiling the plugin.xml, a constant of the form GUID_<guid> may be generated. The component's GUID may be referenced in source code using this constant.

The description property may be a description of your component.

The category property may reference the categories to which the component belongs. Categories may be used for grouping components in a display such as in the visual designer 30. Each category may be defined within its own element. You may create subcategories by separating the category names with forward slashes. For example, if you defined the category as "Company X/Audio", the component would appear in the Audio subcategory of the Company X category.

A component's 24 definition may declare pins (dynamic and static), properties, events, commands, and capabilities. These elements can be used, modified and managed in the component 24 source code. When a component's 24 plugin.xml file is compiled, header and jar files may be generated. These files declare string constants that correspond to the component elements.

A data container 56 holds the media data that flows between components 24. The data container 56 may define a data type and data object. The data type may be metadata describing the data container 56 and may include key-value pairs of information (e.g. width, height). The data types may be configured to implement inherency and hierarchies. Examples of data types include image dimension (width, height) and pixel format (color space, bits per sample). The data object may be the raw data, such as in the form of a buffer, string, and so on. Examples of data objects include file name (string), audio sample (buffer), video frame (buffer), asset XML, and so on.

A data container 46 may include a timestamp in relation to the media data stored therein as the data object. Media data packets typically need to be associated with a timeline as they are received and processed to maintain sequencing and timing. Including a timestamp for the media data stored in the data container 56 enables non-linearity of processing and decouples the processing of the media data from the timeline typically associated with media data. A data container 56 may define a normal form for the input data to be processed by graphs 28 and blueprints 28a. A data container 56 may associate raw data with a data type so that both the raw data and data type flow as a unit to provide concurrency, multiprocessing, which may enable the context to switch at the data container 56 boundaries, and so on. Data containers 56 may include an individual timestamp with reference to the raw data to decouple the raw media data from its state dependent on a timeline. Data container 56 properties may include read only, write only, and read/write. This may be useful if, for example, a data container 56 reaches a branch and needs to be duplicated. One data container 56 may be marked read only so that the contents cannot be modified while a separate operation is processing the contents of the duplicate data container 56, for example.

Figure 4:
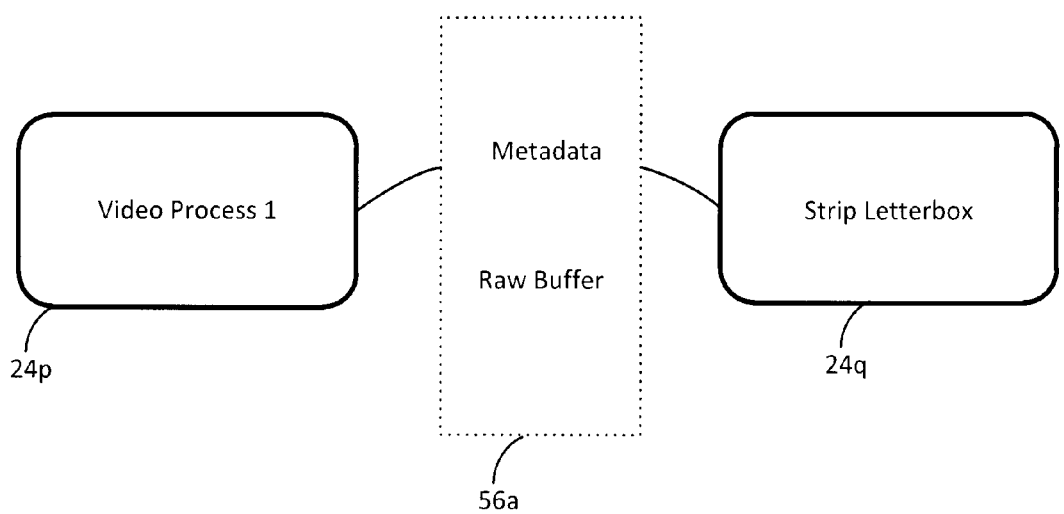
FIG. 4 illustrates a block diagram of example data container and components in accordance with an example embodiment.

Referring now to FIG. 4 there is shown a block diagram of example data container (metadata, raw buffer) 56a that flows between two components 24, video process 24p and strip letterbox 24q.

Data may be passed between components 24 as data container 56 objects. A data container may include a raw data object and a data type object describing the contents of the raw data. A data type object may be a collection of key/value pairs. Its keys may be defined in one or more data type definitions defined in plugin.xml files, for example. Data type definitions may describe features such as image dimensions, audio format, and encoding format. Data type definitions may be inherited and extended.

Data types may consist of a set of keys that accept values of a certain type. The values of the keys can be of either simple or complex types. A simple type may be a primitive type such as INTEGER, BOOLEAN or STRING, while a complex type may be a type where the key's value is itself a data type. Data type definitions may be defined in plugin.xml files, for example. A data type definition may include keys and their value types, and inherited data type definitions. Data type definitions may be defined using the data type definition schema. A data type definition may have attributes or properties such a name (used to reference the data type definition), comments (which may include information about what the data type definition refers to, and how and when it should be use, which may appear in the Data Type frame of the visual designer help interface), inherits (a data type definition can inherit and extend other data type definitions), and so on.

Data type definitions should be decoupled from component definitions. As such, separate plugin.xml files may be used for data type definitions and for your component definitions. If you have defined your own data type definition, you may need to compile its plugin.xml file before using it. Compiling its plugin.xml may generate a header and class file for each defined data type. These may automatically be exported to an SDK installation.

Data type definitions declare a set of keys used to describe raw data. Key value types are specified in the key definitions. Acceptable values for the keys can be specified explicitly in the declaration. Examples definitions include channel configurations, language, and so on.

Key definitions may have attributes or properties. Examples include: simple type/complex type which indicates whether the key's type is a simple type (the value is a primitive type) or a complex type (the value is a data type), key name which may be used to reference the key definition, key comments which may include a description of what property of the raw data the key refers to, the key's value type which may be simple (primitive type), for example INTEGER, STRING, BOOLEAN, or complex (a DataTypeDefinition), where this type should agree with the simpleType/complexType tag, multivalued which indicates that the key may accept a list of 0 or more values, such as for example, the audio_channel_details key may have as many values as there are audio channels, and enumeration value which enumerates all possible values for the key. If a key can only have certain acceptable values, these can be listed as enumerationValues. EnumerationValues may be referenced in the source code using string constants of the form VAL_<key_name>_<value>. For example, the ISO639_1 value of the language standard key may be referred to by the constant, VAL_language_standard_ISO639_1.

A plugin package may be a grouping of data type definitions and component definitions defined in a plugin.xml file, for example. A plugin package can consist of more than one component or data type definition. The plugin may also contain libraries, header files and Java files that may be used to load and support its components or data types.

Data type definitions and components may be distributed in plugin packages. The framework 12 may be shipped with plugin packages. Additional functionality can be added to the framework 12 by purchasing or developing additional plugin packages. Licenses for the framework 12 and its components may be included in a license package. A properties file may be included in the SDK 20 package and may be edited to point to the license server 42.

Components 24, data type definitions and plugin packages can be created using the SDK 20. Each component created may have a unique GUID and each plugin created may need to be signed. A license package may include GUIDs and a signing key.

Plugin package attributes may be defined within plugin.xml files. Component 24 definitions and data type definitions may be defined within the plugin package definition in the plugin.xml file. The plugin package definition may require a name, a unique pluginID, a plugin version, and, optionally, a provider and description. The name is the name of the plugin, the plugin ID is a name that is unique to each plugin (to guarantee uniqueness, the pluginID may be structured using a reverse domain name, for example), a pluginVersion refers to the plugin version, a provider refers to the organization providing the plugin, and description provides a description of the plugin. This should include the type of components or data type definitions that are distributed in the plugin package.

All plugin packages may be signed. Signing guarantees authorship and prevents unauthorized modification of the plugin package. Signing may happen automatically when the plugin.xml file is compiled. At compile-time a private key is requested from the license server. A signature is then generated using this private key. A public key, the plugin certificate, is also generated. When the plugin package is loaded, the certificate is used to verify that the plugin package has not been modified from build time. If the plugin package has been modified, or if it has not been signed, it will not load.

Plugin packages may be compiled using a gradle tool. Plugin packages, even those which do not contain source code, may be compiled to generate header files and files that are used to instantiate their components and data type definitions. Compiling the plugin package automatically signs your plugin package and installs it in the SDK 20 installation. The framework 12 may use gradle to build plugin packages. A SDK 20 installation may come with template gradle build files (build.gradle) for different types of projects.

A graph 28 may be a template describing a set of components 24 (including compound components 26, other graphs 28), the parameter values for the components 24, and the connections between the pins of the components 24. A graph 28 may define a set of components 24 having specific connections and have specific properties (with values). A graph 28 may define a set of components having specific connections and having specific properties. A graph 28 may be referenced within another graph by a label to dereference from the underlying graph 28. This may be useful for versioning, as described herein.

A blueprint 28a may be a final embodiment of a graph 28 and may reference a solution set of components using a label. A blueprint 28a may be used to instantiate a graph 28 at application runtime, and may also meta-data such as include business logic about the graph 28. A blueprint 28a may connect the functionality of a graph to a running environment. A solution set of components 24 may be a set of specific versions of components. A blueprint 28a may form part of the repository 32. Blueprints may be viewed as a business level container of graphs 28. A blueprint 28a may include one or more graphs as part of a single life cycle of the application, which may be executed nested or in parallel, or multiple graph 28 stages may be executed in serial form, one after the other. A blueprint 28a may be a container of one or more graphs 28. A graph 28 can contain other graphs 28 but all run in one lifecycle, whereas the graphs 28 contained at the blueprint 28a level may run simultaneously, or sequentially.

A graph 28 can be represented as a file (e.g. XML file) in its blueprint 28a form or as dynamically instantiated object code at runtime. Graphs 28 may be viewed as having two lives, as a running live instance and as a description of how that instance is saved for communication, transportation, distribution or storage needs. In the live context, it will be referred to herein as a graph 28. In the description context for reference in communication, transportation, distribution or storage needs, it may be referred to herein as a blueprint 28a.

A simple example file is follows:

```
<pinConnections>
   <connection>
      <sourcePath>File Source/out</sourcePath>
      <destination Path>Buffer/in</destinationPath>
   </connection>
   <connection>
      <sourcePath>Buffer/out</sourcePath>
      <destinationPath>YUV to RGB/in</destinationPath>
   </connection>
   ...
   ...
</pinConnections>
```

A graph 28 and blueprint 28a may contain components 24, compound components 26, and may contain other graphs 28 (compound graphs 28). A compound graph 28 can be exported and referenced as a single component 24. The system 10 is operable to reference components 24, compound components 26, graphs 28, blueprints 28a and compound graphs 28 in the same manner.

Referring now to FIG. 5 there is shown a block diagram of an example graph 28 surrounded by a blueprint 28a (e.g. final embodiment of the graph 28) in accordance with an example embodiment. The graph 28 is a compound graph and includes an outer graph 28 and an inner sub-graph 28, both of which contain components 24 (file source 24f, interlace detector 24g, film removal 24h, deinterlacer 24i, noise reduction 24j, file sink 24x). The components 24 and graphs 28 may be connected by pins.

A graph 28 and blueprint 28a may be used by system 10 to develop and deploy a media application, and may be loaded from the repository 32 at application runtime. A graph 28 and blueprint 28a can simultaneously handle source data in one or more of its possible forms in a component 24.

As shown in FIG. 1A, components 24, compound components 26, graphs 28, compound graphs 28, and data containers 56 are maintained in one or more linked repositories 32. A graph 28 may implement a variety of processing roles such as an installer, manager and executor.

A component's 24 lifecycle is connected to that of its parent graph 28. Different component methods may be called during different graph 28 lifecycle states. Before a graph 28 starts, its components 24 may be instantiated and connections may be made between them. Components 24 can complete their configuration after they have been instantiated and before the graph 28 starts. When a graph 28 is loaded from file, its components 24 are instantiated as soon as the graph 28 is fully loaded. Additional graph 28 and component 24 configurations may take place after the graph 28 is loaded, but before it starts. Once a graph 28 starts, its lifecycle may go through a realize, pre-process 1, pre-process 2, sources start and sources stop states, for example.

If the graph or one of its components encounters an error, the graph may abort.

When a component 24 has completed its processing, it may move from the active state to the inactive state. A graph's 28 lifecycle is done when none of its components 24 remain in the active state. The graph 28 may be able to keep track of the state of its components 24 unless these components 28 start their own worker threads. If a component 24 starts its own worker thread, it is responsible for setting its own active flag. A set active method may be used for this purpose, for example. Once all components 24 have become inactive, the graph 28 may enter the Finish state.

Component 24 lifecycle actions include, for example, realize (components load native libraries and perform self-setup, such as allocating memory and reading properties), pre-process 1 and pre-process 2 (components send their output data type information through the graph, and any components that need data type information block until they receive it), sources start (source components start transmitting data, components process data coming through their input pins), sources stop (source components stop transmitting data and processing continues until all data has passed through the graph), abort (a signal is sent to all components to cease activity and pass the abort signal to their threads, and threads may exit their run loop as soon as possible), and finish (all components are inactive and all data transmission and processing has stopped).

If a component 24 needs to perform lifecycle-related actions, they may need to implement the appropriate lifecycle method or function. Example component life cycle methods include post initialize, post load from document, life cycle realize, life cycle pre-process 1, life cycle pre-process 2, life cycle sources start, life cycle sources stop, process, life cycle abort, and life cycle finish.

Post initialize may be called after the component 24 has been instantiated, while the graph is still in the initial state. It may be called to complete the configuration of the component by adding elements that can only be added once the component is initialized. Post initialize may be implemented to create a complex data type restriction, add a property change listener, set the data type on an output pin, dynamically add pins to the component, or perform property validation, for example.

Post load from document may be called after a saved graph has finished loading and while the graph is still in the initial state. Post load from document may be implemented to configure a component based on its connections to other components in the graph, for example.

Life cycle realize may be the first method called when the graph is started. There may be no data passing through the graph when life cycle realize is called, so the component may only have access to its own properties and to data types. Life cycle realize may be implemented to create a worker thread (worker thread is started in sources start), or get and/or verify properties that are set when the graph starts, for example. If a property is only read during the realize state, any changes made to the property value while the graph is running may not be picked up or used by the component. The changes may be picked up and used in subsequent executions of the graph.

Life cycle pre-process 1 may be called once the graph is started and all components are instantiated and configured. Empty data containers, consisting of only their data types, may be sent through the graph to prime components with run-time data type information, such as image sizes and video frame rates. Source components implement life cycle pre-process 1 to send their empty data containers through the graph. Life cycle pre-process 1 may be implemented to provide run-time data type information to other components. With regards to life cycle pre-process 2, as data type information is passed through the graph to prime components, the components that use the data type information can block in life cycle pre-process 2 until they receive the information they need to perform their configurations. Life cycle pre-process 2 may be implemented to block until your component receives data type information needed to complete its configuration or perform its processing, or block sending data through the graph until the graph is completely configured, for example.

For life cycle sources start, once the graph has been primed and all the components are configured, data can begin flowing through the graph. Components can start pushing data through the graph in life cycle sources start. Life cycle sources start may be implemented to transmit data through the graph, or start a worker thread, for example.

If source data running through the graph is stopped through external methods (timed broadcast, user-controlled streaming), life cycle sources stops may be called when a signal to stop the source is detected. Any source clean-up (stopping threads, closing files, etc.) should be implemented in this method. Life cycle sources stops may be implemented to stop the source stream based on an external event, for example.

The process method may be called any time data arrives on a component's input pin. The process method is where all data processing occurs. The process method is where data is retrieved from input pins and placed onto output pins. The process method may be implemented to transform data, retrieve data from input pins, push data onto output pins, change or set properties, and so on.

If an error occurs in the graph, life cycle abort may be called. Life cycle abort is used to stop threads and close files. Life cycle abort may be implemented to stop worker threads, or close files, for example.

Life cycle finish may be the final method called in the graph lifecycle. It may be called when no components remain in the active state. Any final clean-up needed to be done should be implemented in this method. Life cycle finish may be implemented to close files, release allocations, close socket connections, or wait for internal threads to finish, for example.

The repository 32 is operable to manage versioning of components 24, graphs 28, and blueprints 28a in order to keep track of updates, variations, and modifications made to components 24, graphs 28, and blueprints 28a. The repository 32 is operable to handle runtime libraries and engines used by graphs 28, blueprints 28a, and components 24, such that the repository is self-managed with respect to versioning. The repository 32 is further operable to receive the development framework 12 to manage versioning of and updates to the development framework 12. That is, the repository 32 can load up-to-date versions of the development framework 12, including runtime libraries and engines. The development framework 12 may be loaded upon request so that appropriate and updated versions of the development framework 12 are used. The graphs 28 and blueprints 28a are loaded at run time so that the appropriate version of the graph 28 and each component 24 in the graph 28 is used. A blueprint 28a may reference a solution set of components. A solution set of components is a set of components 24 and specific versions of each component 24 in the set. The blueprint 28a may reference a solution set of components using a label. A blueprint 28a may reference a solution set using a label in order to dereference from the specific components 24 and versions of the solution set. That way, if the solution set changes, such as if a component 24 is added or removed from the solution set, or a version of a component 24 changes in the solution set, then the same label will reference the updated solution set without requiring modification to the blueprint 28a containing the label. This may result in more efficient processing as a reduced number of modifications and updates are required. Further, components 24 may be self-contained and isolated from a dependency point of view. The entire dependency set of a component 24 may be self-contained, being specified and packaged in the component distribution unit (e.g. plugin). The component 24 dependencies may also be isolated, referring exclusively to the specific component 24 and version(s) they depend on. This may enable the system 10 to realize complex workflows while resolving components 24 dependencies without user intervention. Further, the dependency isolation may allow the system 10 to provide distinct behavior while executing blueprints built with the same components 24 by isolating the different versions of these components 24 and their dependencies. Processing errors may also be reduced as the system 10 and user may not have to manually track and manually update components defined by blueprints 28a or graphs when a label is used.

Figure 13:
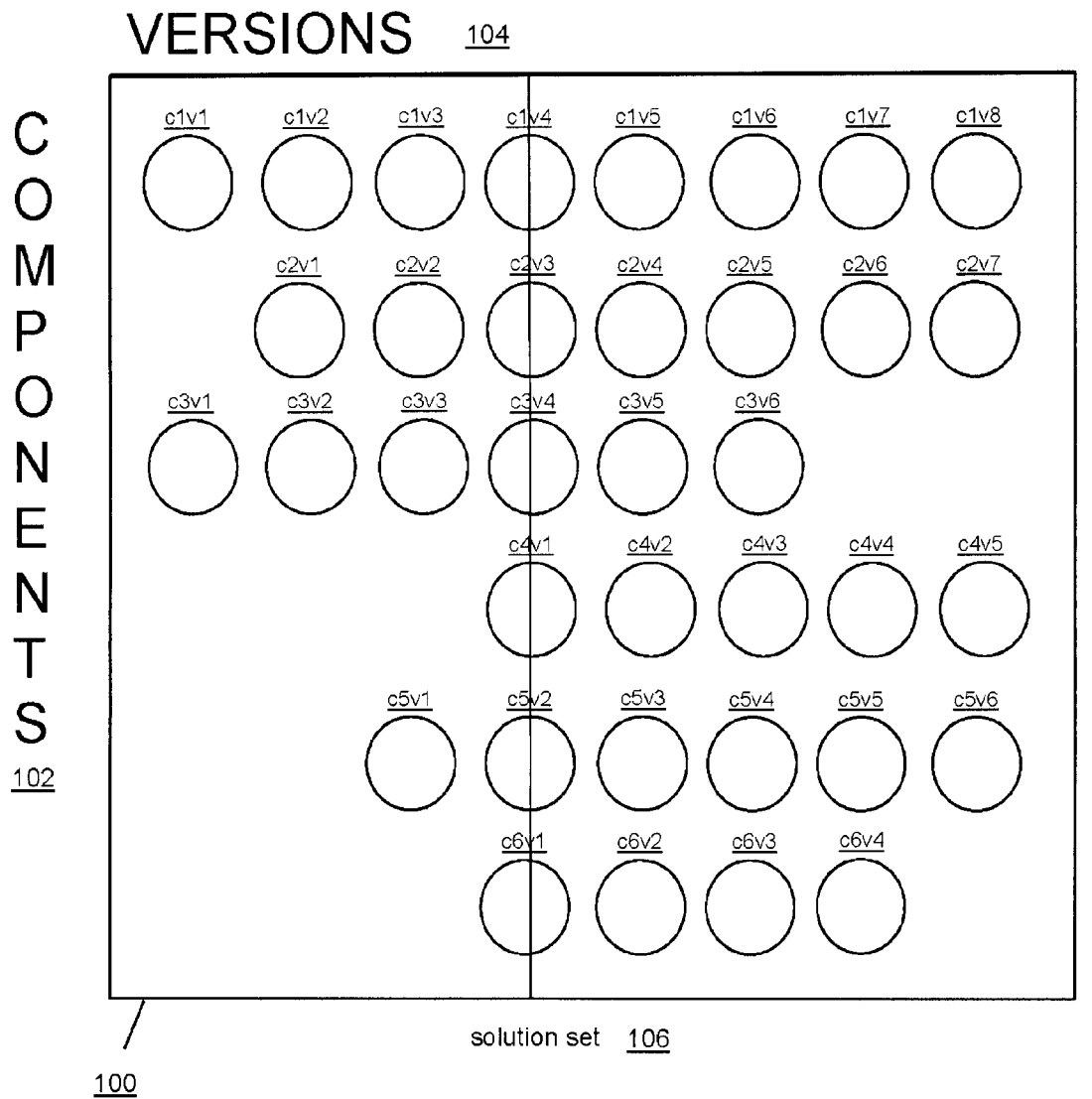
FIG. 13 illustrates a block diagram of an example interface for defining a solution set of components in accordance with example embodiments.

Referring now to FIG. 13 there is shown a block diagram of an example interface 100 for defining a solution set of components in accordance with example embodiments. In this example, the interface 100 displays different types of components 102 along one axis and different versions 104 of each type of component along another axis. In this example there are 6 different types of components 102 and each type may be associated with a component identifier such as for example, c1, c2, c3, c4, c5, c6. System 10 may use the component identifier to reference a particular type of component.

There may be multiple versions 104 of each type of component, or some types of components may only have one version. For example, a type of component 102 c1 may have 8 different versions. Each version may be associated with a version identifier such as for example: c1v1, c1v2, c1v3, c1v4, c1v5, c1v6, c1v7, c1v8. System 10 may use the version identifier to reference a particular version of a specific type of component.

A solution set 106 references a set of components, and more particularly may reference a specific version of each type of component for use by a computing application. In this example, the solution set 106 is the specific version of each type of component that is intersected by a line (c1v4, c2v3, c3v4, c4v1, c5v2, c6v1). The solution set 106 may be modified by changing a version of a specific component, by removing a particular type of component, by adding a new type of component, and so on. The interface 10 may provide a mechanism for a user to efficiently modify, test, and deploy different versions of components by changing the solution set. For example, the interface 100 may change a solution set 106 by sliding a new version of a component to intersect with the line, sliding all versions of a type of component line so that no versions of a particular type of component intersect with the line (i.e. which may indicate that a particular component is no longer part of the solution set), and so on. System 10 is operable to test and deploy a modified solution set 106 for a particular computing application, and can also test all updates made to a solution set 106.

A blueprint 28a is operable to reference a particular solution set 106 using a label to dereference from the specific components and versions of the solution set. If the contents of a solution set 106 changes then the blueprint 28a label will reference the changed solution set 106 without requiring modification to the blueprint 28a. Multiple blueprints 28a may reference the same solution set 106. A blueprint 28a may also reference multiple solution sets 106. If a change is made to the solution set 106 and a label is not used to dereference from the specific components and versions of the solution set, then multiple blueprints 28a may require updating and tracking as referencing the solution set 106 in order to ensure that the blueprints 28a reference the appropriate components 102 and versions 104 thereof.

Also, in accordance with some embodiments, a solution set may itself have a version number. The version number can be referenced by the label of the blueprint 28a to identify which version of the solution set the blueprint is working with. In other embodiments, a blueprint may ignore the version number and automatically update to refer to the latest version of the solution set. The solution set version number may provide a mechanism to maintain and create a history of solution sets as changes are made thereto.

The development framework 12 enables complexity abstraction by defining an entire graph 28 or blueprints 28a as a component 24. A component 24 which defines an entire graph 28 may in turn be used in another graph 28 or blueprint 28a, such that a graph 28 may be embedded within another graph 28 or blueprint 28a. The graph 28 or blueprint 28a may reference the component 24 using a label to dereference from the specific instance of the component 24. That way, if the component 24 is modified then the label of the graph 28 or blueprint 28a will reference the modified component 24 without requiring additional modification to the graph 28 or blueprint 28a. That is, the graph 28 or blueprint 28 will automatically update to reference the modified component 24 by virtue of the label reference. The development framework 12 also provides properties redirection through the ability to expose a component 24 property as a property of an enclosing graph 28. The development framework 12 further enables modular and recursive construction of graphs 28 through the use of pre-packaged graphs 28 and components 24.

Commands, along with events, provide a means for components, graphs and calling applications to communicate outside of the regular data flow. Commands are functions that may be called on components. A command may be executed by passing the command name and an argument (in the form of a data container 56) to a process command method. A data container 56 may be passed to process command method, even if the command will not be using the data. If the command will not be using any data, an empty data container 56 may be passed to process command function.

Command pins may act as triggers to call commands on components. When a data container 56 is placed on a command pin, the process command function may be called with the command name (the name of the pin) and the data container 56 as arguments. The data in the data container 56 may be used by the command, but it does not need to be. Commands may be defined within the component definition file, such as a plugin.xml file for example. Commands may have attributes or properties, such as a name (which may be used to access the command) and description (which may include information such as what the command does and any data the command expects including data type. An example command may be "read" (name) which reads a certain number of bytes starting from a particular location and takes a data container with the number of bytes and a seek position (description).

Events, along with commands, may provide a means for components, graphs and their calling applications to communicate outside of the regular data flow. Events may follow an event listener pattern where components fire events to registered event listeners implementing a node event listener interface. A node event may include the event name (String) and raw data (Object). The identity of the component that fired the event may also be contained within a node event.

Events may be exposed on pins. When an event occurs, the data object generated by the event may be encapsulated in a data container that is pushed onto the event pin. If the event generates a null object, an empty data container may be placed on the pin. The propagation of a data container on an event pin may signal that the event has occurred. Events may be defined within a component's definition file, such as for example a plugin.xml file. Events may have attributes or properties, such as a name (which may be used to access the event) and description (which may include information such as under what circumstances the event is fired and whether the event contains any data Capabilities may be externally defined contracts that define how a component with a particular capability should behave and appear. A capability definition may include information such as the properties and pins that are expected in a component with this capability. Capabilities are intended for components, graphs and applications to request components dynamically based on their functionality. A component may declare that it implements more than one capability. Capabilities are declared in the component definition file, such as for example in a plugin.xml file. Capability names may be unique.

Data processing in a component can follow either a push or pull paradigm. In the push paradigm, data is pushed onto a component's input pin, calling that component's process method. In the pull paradigm, a component will request data from its input pin on a separate internal thread. The internal pulling thread will block until data is received.

When a graph is started, source components may send a priming data container consisting only of data type information through their output pins. The data type information in these "empty" containers may be used by components downstream to complete their configuration. A source component will initially produce an empty data container. Once the empty data container has been sent through the graph, real data will be output. All components should check for empty data containers arriving on their input pins. When an empty data container is received on an input pin, the component should validate the data type information and send out an empty data container of its own consisting of its output data type. An application programming interface class may provide convenience methods for pushing containers, including empty containers onto output pins.

Passing mutable data containers may allow components to perform data processing without making copies of the data. However, in-place modifications should only be done if the data is not being used elsewhere. If the data will be used in two locations (threads, components, methods, etc.) at once, it may be made immutable. If an output pin feeds into multiple input pins, the same data container will be passed to each input pin; the data container will automatically become immutable to prevent the receiving components from modifying the same object.

A component may call clone if immutable method on the input data container if it will be modifying the data container's data object as well as its data type. The method clone if immutable returns a clone of the data container if the data container is immutable; otherwise it returns the data container itself. The method clone if immutable will make a full copy of the entire data object in the data container, potentially using a substantial amount of memory. If the component only needs to modify the data type within the data container, then clone if immutable should only be called on the data type before it is modified.

All stream data type definitions may inherit from a base stream data type definition (data type stream). The stream data type definition includes an end of stream key that indicates whether or not this data container is the last. Marking end of stream is important to signal that no other data will be arriving for processing. All stream source components may set end of stream to true on the last data container they send. The end of stream data container can be empty (no data object). Stream processing components may check for end of stream in the data Type of each data container they receive. When they receive the end of stream data container, they must in turn send out an end of stream data container.

In the push data processing model, data gets pushed onto the component's input pin, calling that component's process method. The process method is effectively called by the component pushing the data onto the input pin. The push model is a passive model. Data containers are "pushed" onto the input pin by the previous component in the workflow. A process method may be called whenever a data container arrives on the input pin. The component may not be active unless it is processing data.

The push model may be used in cases where there is only one pin, or in cases where the input of multiple pins do not need to be coordinated. If the data containers arriving on multiple input pins need to be coordinated, then the pull model may be used.

In the pull model, the component will block until either a data container arrives on the input pull pin or a timeout expires. A worker thread may be used to drive pulling data from the input pins, processing the data, and pushing output to the next component. Methods may be called on pull input pins to pull the data, blocking until either a data container arrives on the pin, or a timeout expires. If the timeout expires before a data container arrives on the pin, a null data container may be returned.

To prevent a pull component from entering a busy loop, it is preferable to block until data arrives rather than until a timeout expires. However there are cases where a timeout is necessary, for example if one pin only receives sporadic input. If one pin will not always receive data, the component can use a timeout on this pin to allow it to continue its processing without this pin's input. Unlike a push processing component, a pull processing component needs to be aware of when to stop processing. An end of stream data container can be used for this purpose. If the parent graph is aborted, a null data container will be returned by the pull method. Pull components may need to verify whether their parent graph has aborted whenever they receive a null data container.

Visual Design Subsystem

The visual design subsystem 30 is operable to output graphs 28 and blueprints 28a for developing media applications using components 24, compound components 26, blueprints 28a and other graphs 28. The visual design subsystem 30 defines relationships between components 24, compound components 26, and graphs 28 using pins to define the connections.

In one example embodiment, the visual design subsystem 30 may be accessible via a cloud computing system. The visual design subsystem 30 may allow a user to create components 24 and graphs 28, and define an order of operations or workflow for the graph 28. The visual design subsystem 30 may allow the user to group components 24 (including compound components 26 and graphs 28) into functional blocks and arrange those functional blocks into specific orders of operation. The visual design subsystem 30 further allows the construction of logic branches which allow for flexibility in execution of the components 24 or functional blocks. The visual design subsystem 30 may also allow for the construction of functional blocks which may operate linearly in time, non-linearly, or as discrete operations with separate lifecycle management.

The visual design subsystem 30 defines a graph by connecting components 24, compound components 26, and graphs 28 using connection mechanisms such as pins.

The visual design subsystem 30 allows parameters for the components 24 to be set and monitored. The visual design subsystem 30 may also allow graphs 28 to be instantly reviewed to test functionality and performance. The visual design subsystem 30 may simplify component 24 and graph 28 testing, development and deployment.

The visual design subsystem 30 may provide an interface, such as interface 10 of FIG. 13, in order to define solution sets of components 24 and versions thereof for use in graphs 28, blueprints 28a, and other components 24. The visual design subsystem 30 is operable to test and deploy a solution set for use in graphs 28 and blueprints 28a. The visual design subsystem 30 is operable to test and deploy a version of a component 24 for use in a solution set for graphs 28 and blueprints 28a.

Referring now to FIG. 6 there is shown a block diagram of an example interface for a visual design subsystem 30 in accordance with an example embodiment. The example interface for a visual design subsystem 30 includes a graph 28 and components 24 (file input 24u, color space converter 24v, logic branch 25 with routing based on image width and height, scaler 24w and AVC encoder 24y). Other example components 24 include YUV to RGB, Java image controller, scripted component, flow control component, and so on. The example interface for a visual design subsystem 30 illustrates an interface 80 for setting the properties 25 and values 27 for components 24.

The visual design subsystem 30 outputs a graph 28 or blueprint 28a, which may be stored in the repository 32 for subsequent use and reference. For example, the visual design subsystem 30 may output a file (e.g. XML file) which describes a graph 28, components 24, compound components 26, blueprints 28a, and compound graphs 28. The file describes the components 24 that are used, the parameter values, and the connections between the pins of the components 24. A graph 28 may be used as part of media applications and may be loaded by the system 10 at run time to ensure the appropriate components 24 of the graph 28 are used. For example, a graph 28 may reference a solution set of components 24 and versions thereof. The solution set may change or update, and because the graph 28 references the solution set by label the appropriate solution will be loaded by the system 10 at run time. The repository 32 maintains a collection of graphs 28, blueprints 28a, and components 24. The repository 32 manages versioning of components 24 and graphs 28 to keep track of updates made to components 24 and graphs 28, and new versions thereof. The graphs 28 are loaded at run time so that the appropriate version of the graph 28 and each component 24 in the graph 28, as defined by a solution set for example, is used. Further, the graphs 28 may reference the solution set by label so that if the solution set is changed the graph 28 will automatically reference the changed solution set without requiring a manual update to the graph 28. That is, the blueprint with the label may automatically reference the changed solution set without requiring a manual update. A solution set may be referenced by different blueprints 28a using the same or different labels. For example, a user may configure a blueprint 28a with a label for a solution set, such as "ready for testing" or "passed testing" and another user may configure the same or different blueprint 28a with a different label for the same solution set, such as "MY SET", for example. The label provides a descriptive mechanism for a user and also provides efficient processing and propagation of updates. The label may continue to reference a solution set even if a modification is made thereto. Labels may also be used to reference components 24, blueprints 28a, graphs 28, and so on. Different labels may be used to reference the same components 24, blueprints 28a, graphs 28, and so on.

The visual design subsystem 30 may export a blueprint 28a or a graph 28. For example, the blueprint 28a may be instantiated on a desktop platform as a local engine or subset of an application, or in the cloud by a cloud engine 36. A blueprint 28a may be considered to be a final embodiment of a graph 28. A blueprint 28a and a graph 28 reference a solution set of components and versions thereof using a label.

The visual design subsystem 30 may be an engine or object code that can be run through an application interface or through the set of SDKs. The visual design subsystem 30 is operable to construct graphs 28, test graphs 28, perform run time validation, and simulate graphs 28.

The visual design subsystem 30 may perform design time media inspection and propagate media type, data container information and component configuration changes across graphs 28 and blueprints 28a thus validating proper realization of the graph 28 and blueprint 28a into a media application that can process the desired type of media. For example, labels may be used to reference solution sets so that if the solution set changes then label used in the blueprints 28a will also reference the updated solution set without requiring the blueprint 28a to be updated. The visual design subsystem 30 enables complexity abstraction by defining an entire graph 28 or blueprint 28a as a component 24. Accordingly, data containers 56, components 24, compound components 26, graphs 28, and blueprints 28a may be generally referred to herein as components 24, and may be used like components 24 as building blocks for computing applications.

The visual design subsystem 30 may provide properties redirection through the ability to expose a component 24 property as a property of an enclosing graph 28. The visual design subsystem 30 enables modular and recursive construction of graphs 28 through the use of pre-packaged or pre-constructed graphs 28 and components 24. The visual design subsystem 30 uses the repository 32 to provide graph 28 and blueprint 28a persistence storage and versioning strategy enabling backward compatible changes. The visual design subsystem 30 provides dynamic, override-able and decoupled user interface support.

Figure 1B:
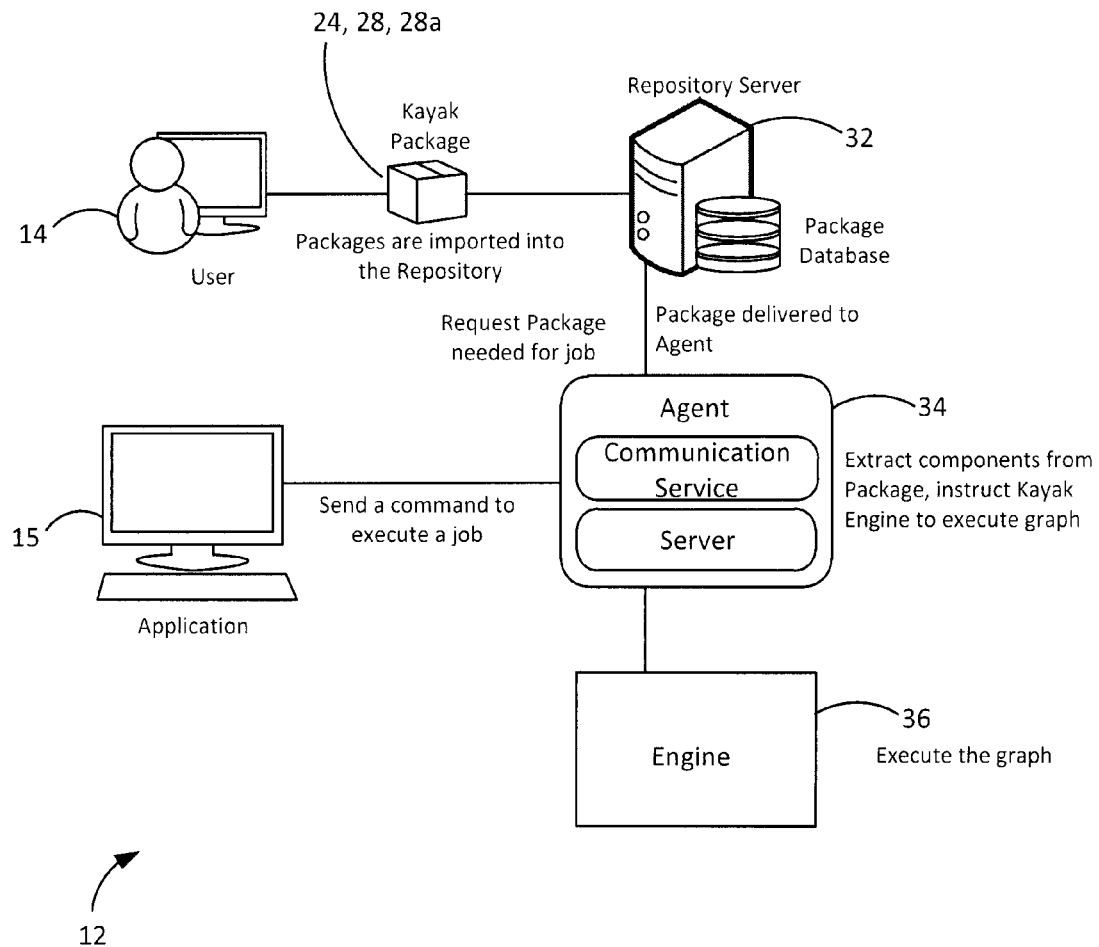
FIG. 1B illustrates a block diagram of the data flow of a system for dynamic development and deployment of computing applications, in accordance with an example embodiment.

Referring now to FIG. 1B there is shown a block diagram of the data flow of a system 12 for dynamic development and deployment of computing applications, in accordance with an example embodiment.

The system 12 may include a user system 14 delivering a plug in package that may contain one or more components 24, graphs 28, and blueprints 28a. The system 12 is also shown to include a repository 32, agent 34, engine 36 and an application system 15.

Components 24 may be stored in a repository server 32. The repository server 32 manages the components availability, versioning and OS/platform capability. When a new job is running the agent 34 will contact the repository server 32 to acquire the components 24 required by the engine 36 which will be running the graph 28/blueprint 28a.

Components 24 may be delivered to the repository server 32 as Plugin Packages. The Plugin Packages contain one or more components 24 of related functionality. The Plugin Packages may also include graphs 28 or blueprints 28a for example. Note that each Plugin Package may also be signed and have a manufacturer's digital certificate. Third party Plugin Packages may require a certificate with their company's identifier before the package may be recognized by the repository 32. This certificate may be provided by a certification agent, as will be described in relation to FIG. 14.

The visual designer 30 may provide a graphical interface that can be used to create new graphs 28, or to create new compound components 26 based on existing components 24. Compound components 26 include components 24 embedded within other components 26, and may be referred to herein simply as components 24. Components 24 are the basic data processing elements. Components 24 may have input pins (which allow data to enter the component), output pins (which allow data to leave the component) and settings (which allow the user to set some of the parameters/properties which define what happens to the data when it is processed by the component). Compound components 26 can be created using existing components 24 and these compound components 26 can be saved as new components 24.

A graph 28 is a set of connected components 24. Components 24 are connected via their pins. Data is encapsulated and passed between components in data containers 56. A data container 56 may be comprised of a data object (the raw data that is being processed) and a data type (meta-information about the raw data).

A graph 28 can be a specific workflow solution or a graph 28 can be embedded within another graph 28 as part of a more complex workflow. Complete workflow solutions can be saved to the repository 32 as blueprints 28a.

Deployment Subsystem

The deployment subsystem 14 may include one or more linked repositories 32, a license server 42, cloud agents 34 on user computing systems, cloud engines 36 run by the cloud agents 34, a job manager 50, and a security module 46. The deployment subsystem 14 provides external interfaces 38 to repositories 32 to manage components 24, blueprints 28a and graphs 28, to the job manager 50 to manage application jobs, and to cloud engines 36 to manage the execution of graphs 28 and blueprints 28a.

The deployment subsystem 14 may include a computing application used to manage the workflow and to define the graphs 28. This application may optionally provide access to a graph creation tool such as the visual designer 30. The deployment subsystem 14 may include an agent 34 which may exchange commands and status between the application and engines 36. One agent 34 can communicate with more than one engine 36. The deployment subsystem 14 may include an engine 36 which is operable for running components 24 in a graph 28.

The deployment subsystem 14 may include a license server 42 used by engines 36 to check in and out licenses for the purchased components 24. The license server 42 may also be used to enable the application. The deployment subsystem 14 may include a repository server 32 used to store the components 24 that are to be deployed on engines 36.

There may be two types of deployments: stand-alone/desktop deployment; and network deployment.

Figure 18:
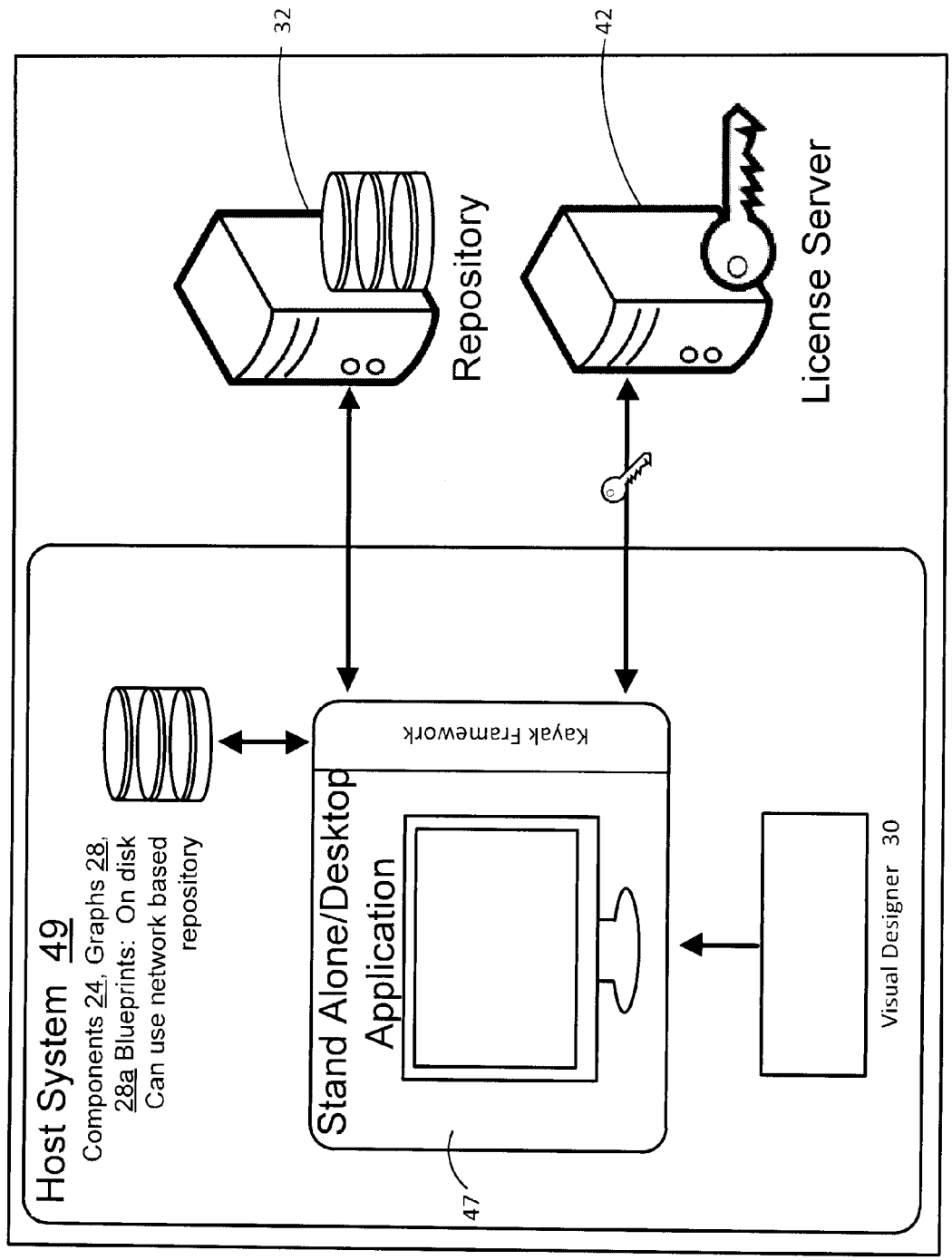
FIG. 18 illustrates a block diagram of stand-alone deployment in accordance with example embodiments.

Referring now to FIG. 18 there is shown a block diagram of stand-alone deployment. In this type of deployment the application 47 accesses the development framework 12 API directly. All of the components of the deployment can be installed on a single host system 49. That is, the local disk is used to store components 24, graphs 28 and blueprints 28a. Alternatively, the repository 32 may be used instead of the local disk to provide a database of plugin packages. The repository 32 can be used by more than one host system 49. The license server 42 can be installed on the host system 49 for a true "stand alone" deployment, or it can be installed on the network so that it can be accessed by more than one host system 49, to allow for network licensing.

Figure 19:
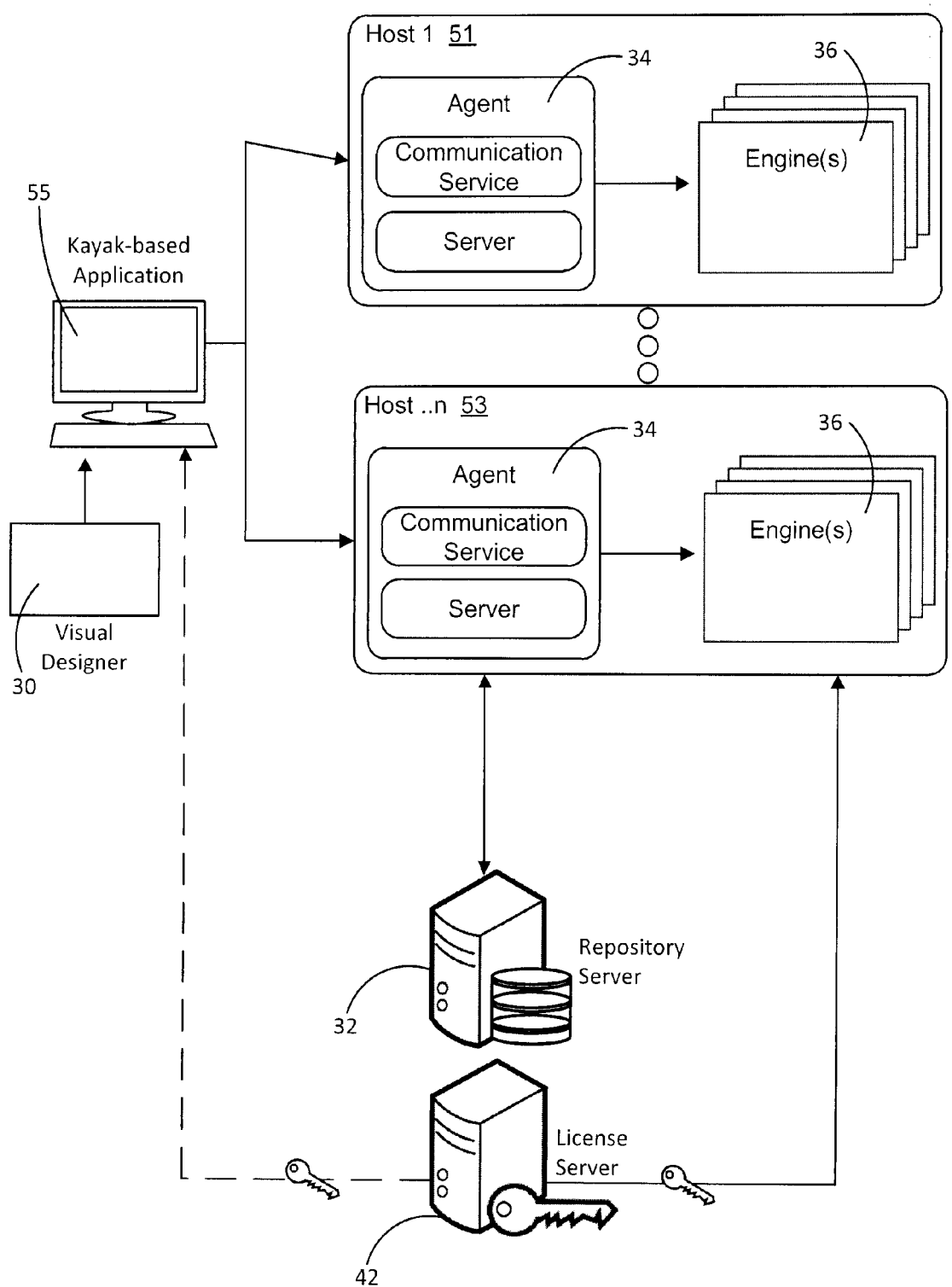
FIG. 19 illustrates a block diagram of network deployment in accordance with example embodiments.

Referring now to FIG. 19 there is shown a block diagram of network deployment. In this type of deployment an agent 34 is required to communicate with the higher level management application 55 and to communicate with the engines 34. The agent 34 may reside on one to n different host systems 51, 53. Access to a repository 32 may be required for network deployment.

An agent 34 may be the dispatch/coordinating service installed on all host systems which will run engines 36. An agent 34 may coordinate management and monitoring of systems on the network and dispatches and monitors jobs running on engines 36. An agent 34 communicates with higher level applications (for example, job manager 50) through a web services interface, for example. Agents 34 may include a communication service and a server service. Agents 34 can coordinate management and monitoring of more than one engine 36 or a mix of engines 34 on the same system, the only restriction may be the practical limits of the host system's resources (cpu, memory, bandwidth, etc).

An engine 36 is a running version of a graph 28 or blueprint 28a. An engine 36 may access source files, write output files and return status to the agent 34 or Kayak-based application. An engine 36 communicates with the agent 34 to acquire the required components 24 and with the license server 42 to authorize the components 24 required to run the graph 28.

The repository 32 stores components 24, compound components 26, blueprints 28a and graphs 28. As one example, the repository 32 may be a web services based repository accessible through a cloud computing system via external interfaces 38. As another example, the repository 32 may be stored on a local system. The deployment subsystem 14 may use one or more linked repositories 32 for version management, maintenance and deployment. The repository 32 is a hosted collection of components 24 and graphs 28 which are accessed by a protocol, identified as required, and transferred to the target host environment. As an illustrative analogy, a graph may be viewed as a recipe (i.e. template) listing different ingredients (i.e. components) and the repository 32 contains the blueprint 28a for the graph 28 and components thereof to provide the user with both the "recipe" and the "ingredients" listed in the "recipe".

The repository 32 organizes each component 24 (regardless of whether it is a standalone component 24 or is a compound component 26, graph 28, blueprint 28a, or solution set with reference to other components 24) with respect to revision (i.e. versions of the component), ownership structure, licensing requirements, and dependencies on other components 24 or technologies. These dependencies or requirements may further require specific revisions of technologies or components 24 for proper function.

The repository 32 manages versioning such that it can determine the most appropriate version of a component 24, graph 28, and blueprint 28a. The appropriate version of a component 24 may be defined by a solution set. The repository 32 allows access to any of the available versions of components 24 and graphs 28, which may include the most recent version but necessarily. The repository 32 may interact with interface 10 in order to provide available versions for each component and define solution sets. For example, a customer may want a version of a component 24 that they have tested instead of the latest version, and may include the tested version in the solution set. This is may be important for downstream management. When a graph 28 and blueprint 28 thereof is used by an application the components 24 defined by the solution set referenced by the label in the blueprint 28a or graph 28 are loaded from the repository 32 at media application runtime so that the proper version of the components and graphs are used. The repository 32 is configured to provide versioned components 24 with multi stage capability, automatic component update propagation and gated component update release.

Figure 7:
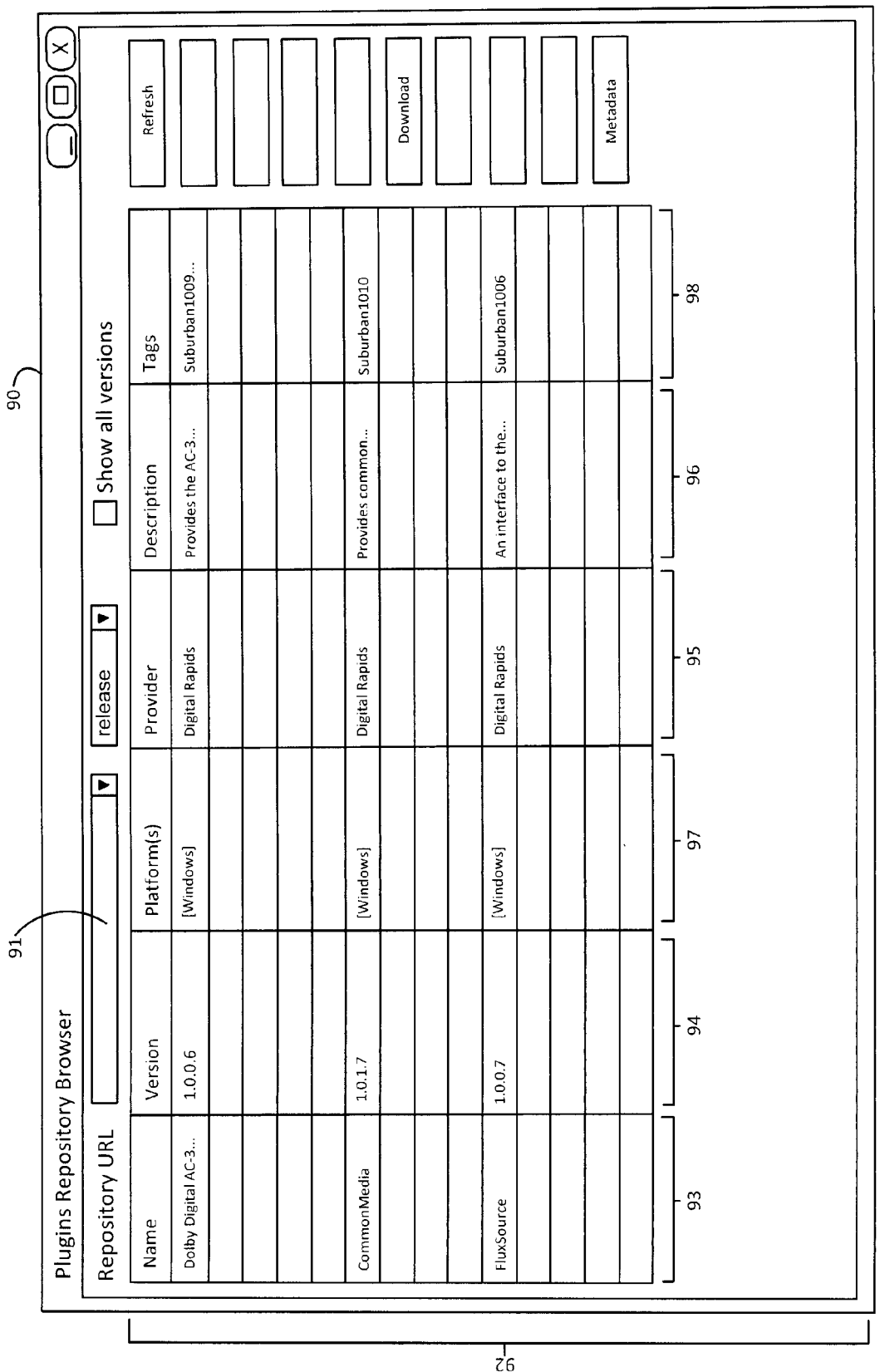
FIG. 7 illustrates a block diagram of an example interface for a repository in accordance with an example embodiment.

Referring now to FIG. 7 there is shown a block diagram of an example user interface 90 for a repository 32 in accordance with an example embodiment. The example interface 90 for the repository 32 displays an address 91 for the repository, such as a uniform resource locator. The example interface 90 for the repository 32 displays a listing 92 of names 93 of components 24, compound components 26, and graphs 28, along with an associated description 96, provider 95, and version 94. The listing 92 may also include an associated status, such as complete, tested, and so on. The interface 90 may also include the interface 10 of FIG. 13.

There may be multiple linked repositories 32a, 32b and a media application can access the multiple repositories when a graph 28 or blueprint 28a is used by the media application at runtime. Examples of repositories 32 include staging, preproduction, and production.

A cloud agent 34 may be provided to a user computing system to manage the local resources of the host computing system. The term 'cloud' as used herein may describe a heterogenous environment where agents can live in the cloud or on desktops, laptops, mobile devices, and so on, and is not limited to 'cloud computing systems' accessible through the Internet. That is, a cloud agent 34 may also refer to a desktop agent, local agent, and so on. The cloud agents 34 may interact with cloud engines 36 to execute graphs 28 and blueprints 28a thereof in order to run media applications, or other computing applications. At application runtime, a pool of one or more cloud agents 34 can access a shared repository 32 of components 24 and graphs 28 to construct the application. A cloud agent 34 is operable to instantiate blueprints 28a of a graph 28 and run them in a cloud engine 36.

A cloud engine 36 provides a running environment for blueprints 28a of graphs 28 and creates media applications on the blueprints 28a of the graph 28. The term 'cloud' as used herein may describe a heterogenous environment where engines can live in the cloud or on desktops, laptops, mobile devices, and so on, and is not limited to 'cloud computing systems' accessible through the Internet. That is, a cloud engine 36 may also refer to a desktop engine, local engine, and so on. The cloud engine 36 is a runtime construct which receives blueprints 28a of graphs 28, analyzes and organizes component 24 dependencies, executes protocols for retrieval of the required components 24, constructs those components 24 into new run-time executables and dispatches those executables against a dynamic job or process. The dispatch of new run-time executables can be persistent or dynamic in nature. In persistent mode the cloud agent 34 registers the availability of cloud engines 36 with the calling server or application and no further deployment (installation) is required. In dynamic mode each executable can be 'renewed' at each job instantiation creating a new 'product' with each deployment.

The cloud agent 34 can be implemented as a desktop application or a cloud based application (using an external interface 38). For a cloud based application, the cloud agent 34 may be required to manage the cloud engine 36 and provisioning for specific components 24, graphs 28, blueprints 28a and other resources. For the desktop application, a dynamic link library may be used and the system SDK 20 may allow for dynamic updates of components 24 and graphs 28.

The cloud engine 36 is operable to coordinate the license server 42 and the repository 32. The cloud agent 34 is operable to dispatch, manage, and run independent, unrelated functionality on a single host system.

The cloud agent 34 is operable to provide interfaces and control over lifecycle of functional blocks of components.

The cloud agent 34 is operable to monitor, aggregate, and report information about the environment in which it is running to allow for maximum optimization and balance of work.

A cloud engine 36 is operable to execute a graph 28 or blueprint 28a thereof at application runtime in order to construct and deploy a media application, or other computing application. At application runtime a cloud engine 36 is operable to use a blueprint 28a of a graph 28 and the solution set referenced in the blueprint 28a in order to identify components 24 and other graphs 28. Further as a facilitator for version resolution, components 24 may be self-contained and isolated from a dependency point of view. The entire dependency set of a component 24 may be self-contained, being specified and packaged in the component distribution unit (e.g. plugin). The component 24 dependencies may also be isolated, referring exclusively to the specific component 24 and version(s) they depend on. This may enable the system 10 to realize complex workflows while resolving components 24 dependencies without user intervention. Further, the dependency isolation may allow the system 10 to provide distinct behavior while executing blueprints built with the same components 24 by isolating the different versions of these components 24 and their dependencies.

The cloud engine 36 is operable to send a request to the repository 32 for the identified components 24 and graphs 28, receive a copy of the components 24 and graphs 28 from the repository 32, and dynamically build a media application using the components 24 and graphs 28. Cloud agents 34 run the cloud engines 36. A cloud agent 34 is operable to instantiate blueprints 28a of graphs 28 and run them in a cloud engine 36.

A cloud engine 36 is registered with a shared repository 32 and dispatched by job manager 48. The shared repository 32 works similar to a local repository but its contents are shared by a pool of cloud agents 34. The job manager 50 dispatches blueprints 28a of graphs 28 cloud agents 34 referencing available licenses in the license pool 44 as maintained by the license server 42.

The cloud agent 34 may provide life-cycle management services for the cloud engine 36 which in turn manages the components 24, blueprints 28a and graphs 28. The cloud engine 36 is operable to control all components in a multithreaded and multi-process execution environment and to manage initialization. The cloud engine 36 may enable early propagation of data type information. The cloud engine 36 may provide graceful and non-graceful termination.

The cloud engine 36 is operable to provide component configuration services for graph 28 execution. The cloud engine 36 is operable to provide the ability to auto-configure component 24 settings based on the input data type avoiding unnecessary user input.

The cloud engine 36 is operable to provide the ability to configure individually each input pin to function according to a push or pull model allowing heterogeneous components 24 to connect to realize the graphs (blueprints).

The cloud engine 36 is operable to provide memory management services through memory pools, garbage collection and lifecycle management for large data objects.

The cloud engine 36 is operable to manage data communication pathways in between components 24 allowing them to connect and pass data to realize the blueprints 28a.

The cloud engine 36 is operable to define generic media data type and metadata model (video, audio, time code, subtitles, closed captions), a specific application domain data dictionary, a mechanism to encapsulate data and data-type information with data packets for richer information and optimizes data container management The cloud engine 36 is operable to provide hierarchical data-type representation of the information occurring in the graph. The cloud engine 36 is operable to provide data-type transformation strategies to ease component manipulation of data-types.

The cloud engine 36 is operable to provide multithreaded data integrity through immutable (read-only) packets and data access performance optimization, components altering 'writable' packets in-place, copying only read-only data.

The cloud engine 36 is operable to provide out of process execution support, thus enabling blueprints execution in separate processes, while managing large data structures transfer, inter process communication and transparent shared memory when possible.

The cloud engine 36 is operable to provide support for multi-language component development with communication and interoperability between them.

The cloud engine 36 is operable to provide cross platform application execution support, allowing graphs to be executed on multiple types of platforms, including Windows, Mac, Linux platforms, for example.

The license server 42 is operable to dynamically manage a license pool 44 of licenses and associate licenses with components 24 and graphs 28. The license server 42 is operable to determine whether a requesting user has the appropriate license for the components 24 identified in a graph 28 that forms part of the media application. A user may only be permitted to use components 24 and graphs 28 if they have the required and appropriate license. This allows a user to use the technology across departments, groups and companies depending on the conditions of the license associated with the various components 24 of the graphs 28. Further, this enables a provider to control and track use of its components 24 and graphs 28. The license server 42 provides tracking of all 'in use' technology and provides for a central accounting mechanism. The licenses can be controlled by concurrency, physical system, floating, and leased.

Figure 17:
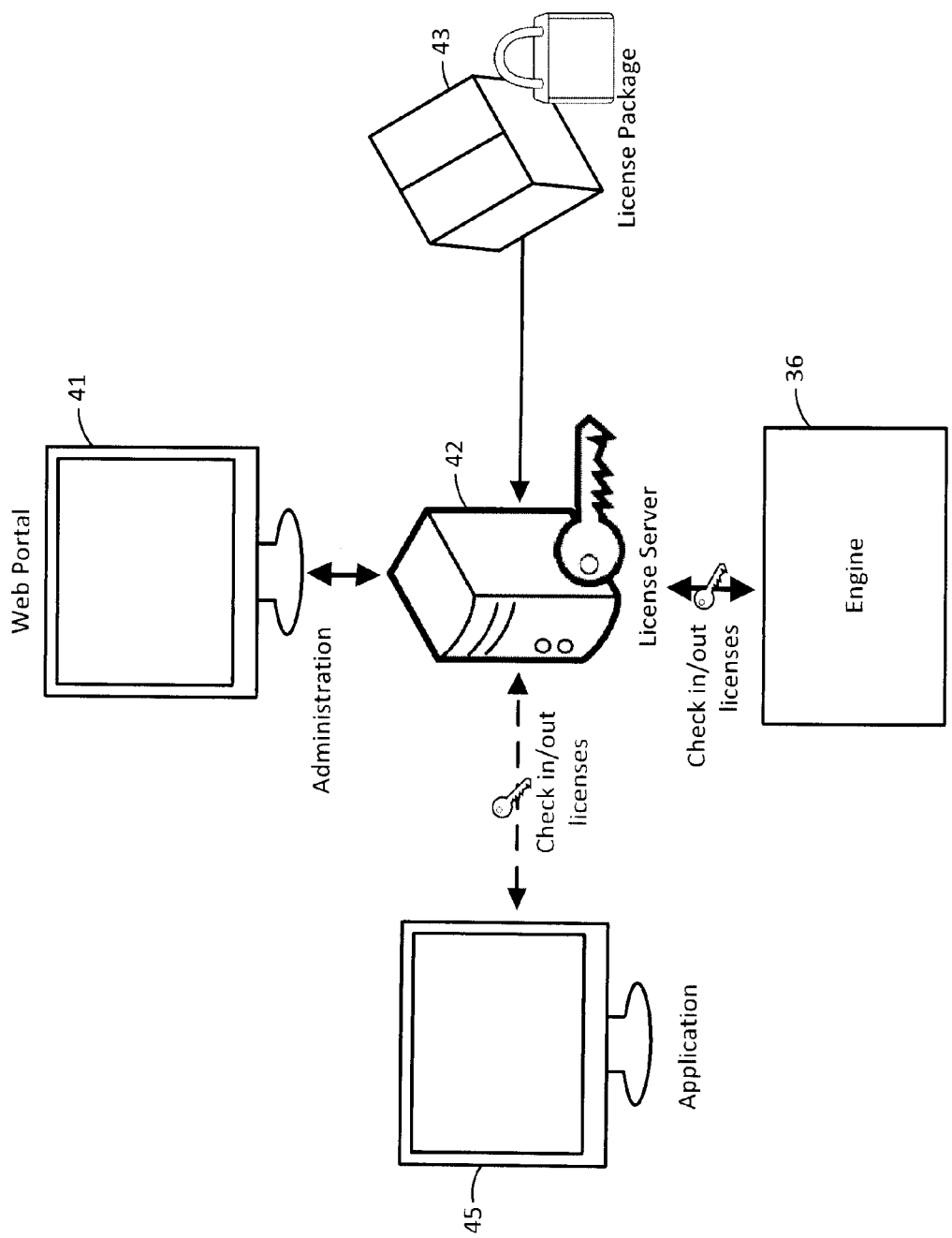
FIG. 17 illustrates an example browser based console to access the license server in accordance with example embodiments.

That is, the license server 44 provides runtime authorization to components 24 through a pool of available licenses. Referring now to FIG. 17, there is shown an example browser based console 41 which can be used to access the license server 44 to show which features are available, how many are currently in use, and which systems are using the features. The license server 44 can access and/or import plug-in package 43 of licenses. Engines 36 can access the license server 44 to check out licenses for the components 24 required to run a graph 28 and to check in those licenses once the graph 28 has finished running. An application system 45 can access the license server 44 to check out licenses for the components 24 required to run an application and to check in those licenses once the application has finished running.

The job manager 50 is configured to provide job/engine dispatch, failover, tracking and reporting. The job manager 50 dispatches cloud engines 36 based on available resources, system availability, processing capability, available licenses in the license pool 44 maintained by the license server 42. In particular, the job manager 48 dispatches cloud engines 36 based on the latest or appropriate graph blueprints 28 registered with production repository 32 and available licenses in the license pool 44. The job manager 50 may also be configured for mapping graphs 28 to cloud engines 36. The job manager 50 may also be configured to provide the highest level of access to the running cloud engines, and provide centralized access to the cloud engines 36 regardless of state (running or not). The job manager 50 may further self-extend interfaces (e.g. web services) based on the graph 28/blueprint 28a that is loaded on the cloud engine 36 to provide a namespace (for example, similar to the web) which may allow the developer to discover which graphs 28 and components 24 are used in that particular computing application, query parameters, set parameters, and so on.

Figure 8:
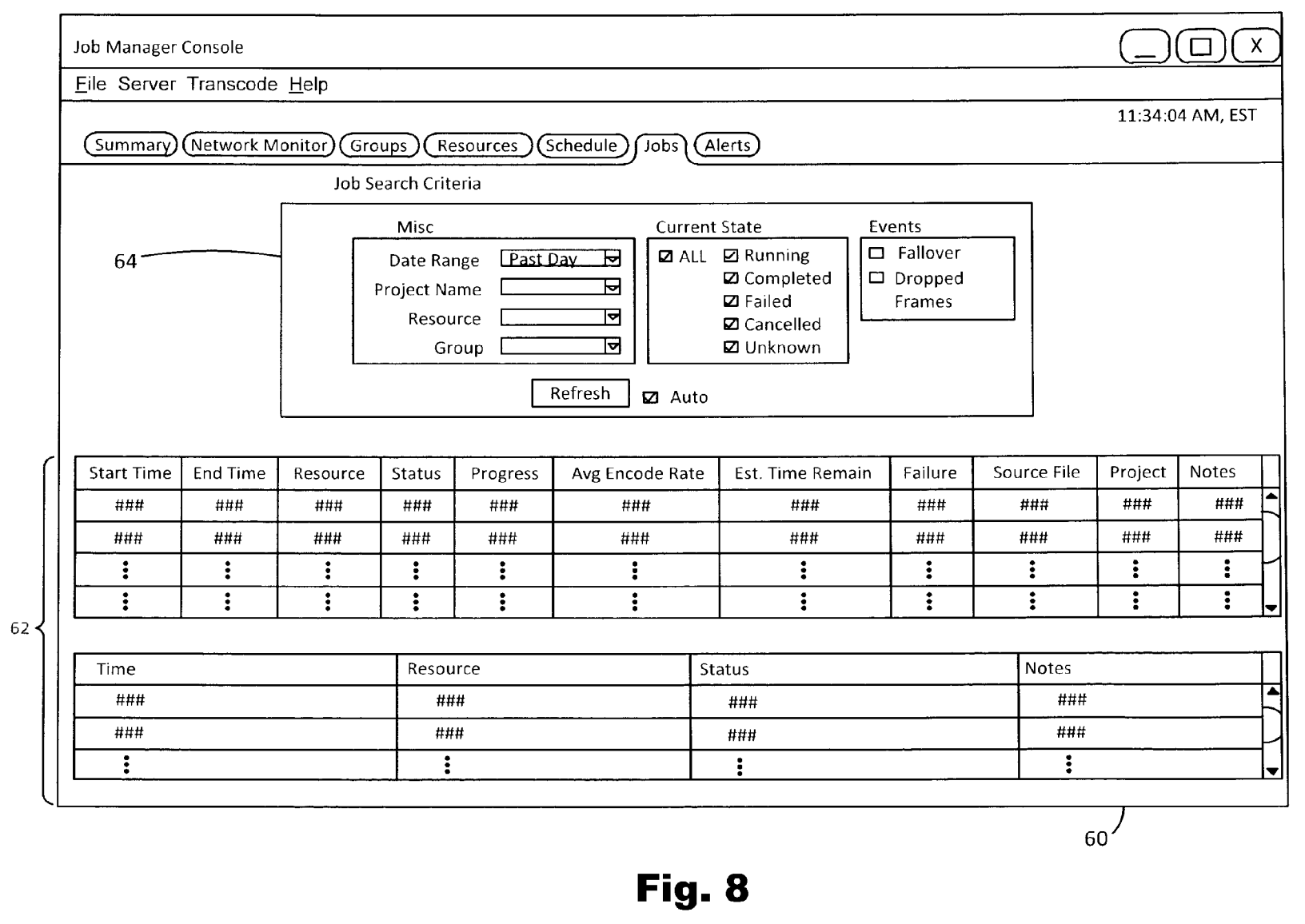

Referring now to FIG. 8 there is shown a block diagram of an example interface 60 for a job manager 50 in accordance with an example embodiment. The interface 60 provides a listing 62 of resources managed by the job manager 50 including a start time, end time, resource name, status (e.g. running, completed, failed, cancelled), progress, average encoding rate, estimated time remaining, failures, source file, project, and notes. The interface 60 may also include a search box 64 for searching for jobs managed by job manager 50. The search box 64 may provide a variety of search parameters such as date range, project name, resource, group, current state, and events (e.g. dropped, failover), for example. The interface 60 is operable to provide a variety of pages or windows, such as a summary, network monitor, groups, resources, schedule, jobs, and alerts, for example.

The security module 46 provides for secure connections and communications within system 10.

A code signing module 40 is operable to digitally sign each component 24 to associate a developer, license, or both with each component 24.

The translation module 58 is operable to translate multiple languages into a common language for system 10.

An interface application may provide users with a way to create graphs 28 and to run those graphs 28. The graph 28 creation may be programmatic, where a graph 28 is generated based on a few user selected parameters, and the actual graph 28 itself is hidden from the user. At the other end of the spectrum the interface application may provide full access to the visual designer 30, with the user choosing and connecting the components in the graph 28 manually. The interface application may also provide a way to select the data inputs for the graph 28 (e.g., source files), to set the outputs for the graph 28 (e.g., archive files), and to monitor and control the execution of the graph 28.

An example of an interface application is job manager 50 with job engines 34. The job manager 50 may be a media manager server which manages file transcode jobs. User access to the Media Manager Server may be via an interface application. Jobs are submitted to the server by adding source files to watch folders. Watch folders are associated with job projects (graphs 28 for transcoding jobs). Graphs 28 may be created using a customized version of the visual designer 30. The Media Manager Server may have access to a pool of transcode host systems, and each transcode host system may communicate with the Media Manager Server using an agent 34 installed on the host. When a job is submitted the source file and project (graph 28) are sent to a host system with an agent 34 which will then manage the engine 36 which processes the job. Status is returned to the Manager Sever while the job is being processed and when the job completes.

Figure 1C:
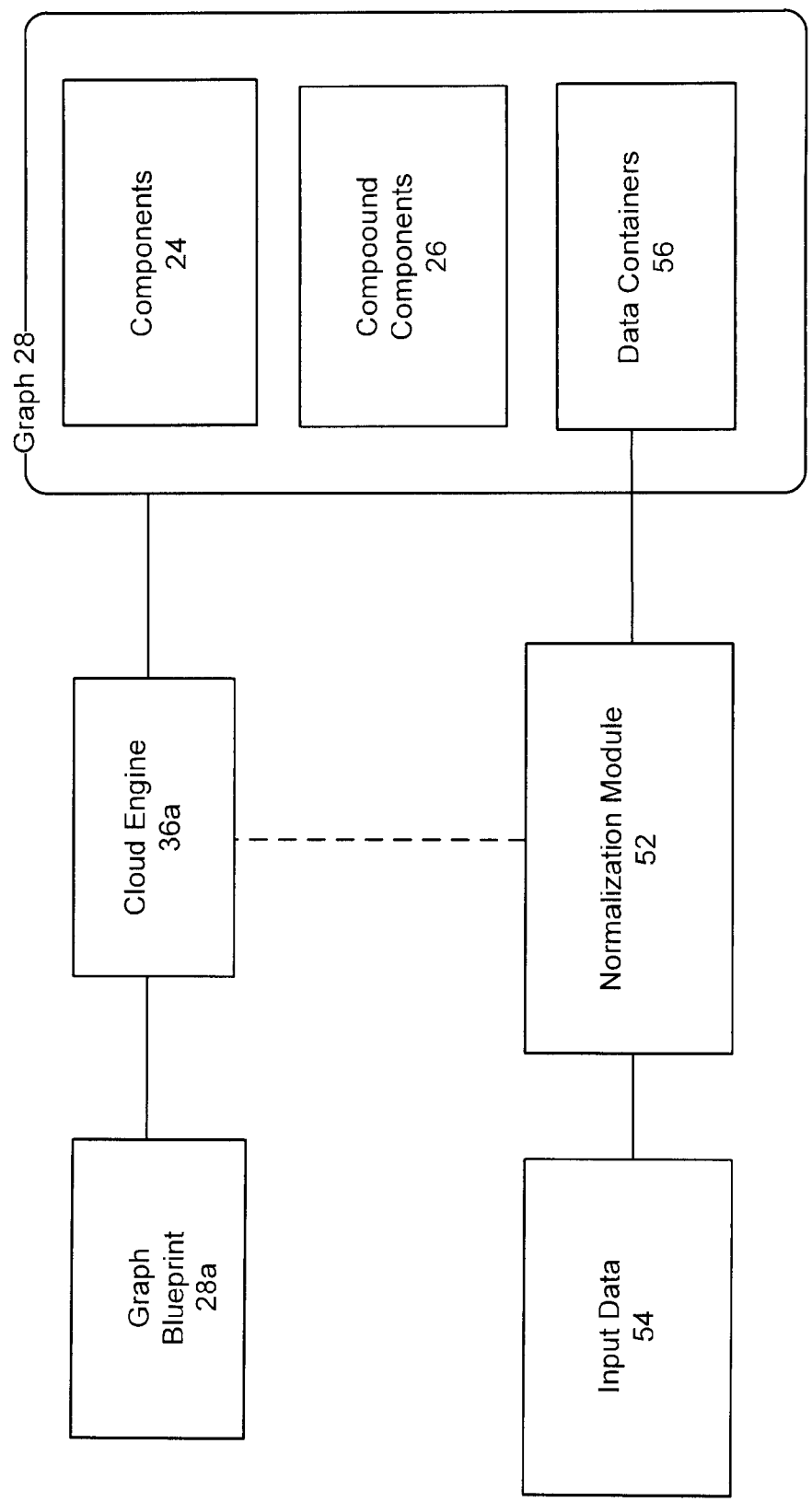
FIG. 1C illustrates another block diagram of the data flow of a system for dynamic development and deployment of computing applications, in accordance with an example embodiment.

Referring now, to FIG. 1C there is shown a block diagram of the data flow of a system for dynamic development and deployment of media applications, in accordance with an example embodiment. A blueprint 28a is a container of one or more graphs 28. A graph 28 can contain other graphs 28 but all run in one lifecycle, whereas the graphs 28 contained at the blueprint 28a level may run simultaneously, or sequentially. Cloud agents 34 and cloud engines 36 may be operable to receive a blueprint 28a and use it to instantiate a graph 28 of components 24, compound components 26, and data containers 56.

The normalization module 52 is operable to receive input media files 54 (which may be files as in the original document, live media and so on), and convert and parse the input media files 54 into data containers 56 to be processed by the graph 28/blueprint 28a. The normalization module 52 extracts as much data as possible from the input media file 54 to populate the data containers 56 and the data type and data objects of the data containers 56. The normalization module 52 can match the input data to a dictionary of languages linked to data types in order to populate the data type component of the data containers 56. Normalization module 52 capability may be distributed across various components (being actually provided by specific components or for example a media file input component).

System 10 may be implemented as a cloud computing system and the user may access system 10 through external interfaces 28 (such as web services for example).

Figure 9:
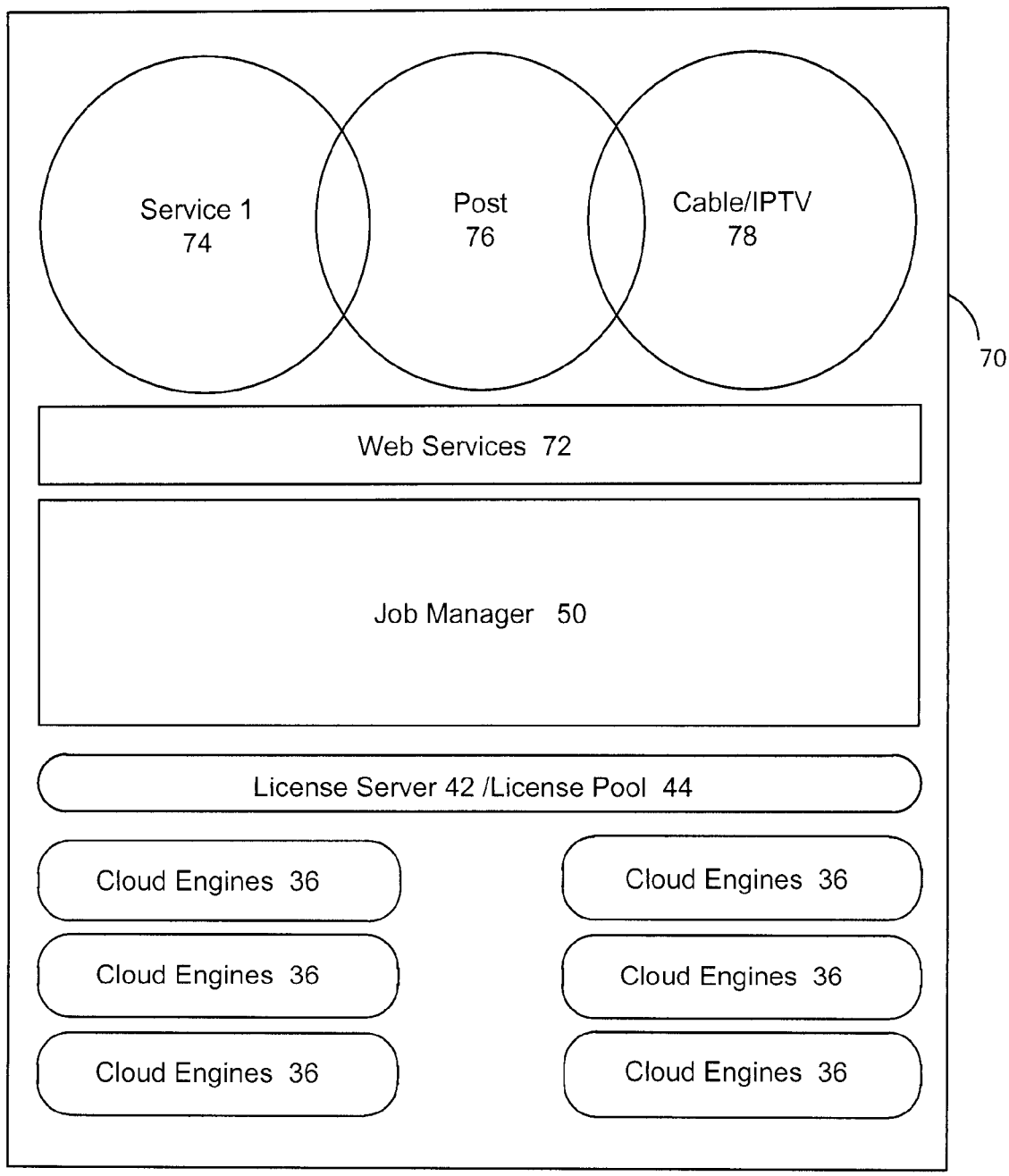
FIGS. 9 and 10 illustrate block diagrams of example web services implementations in accordance with example embodiments.
Figure 10:
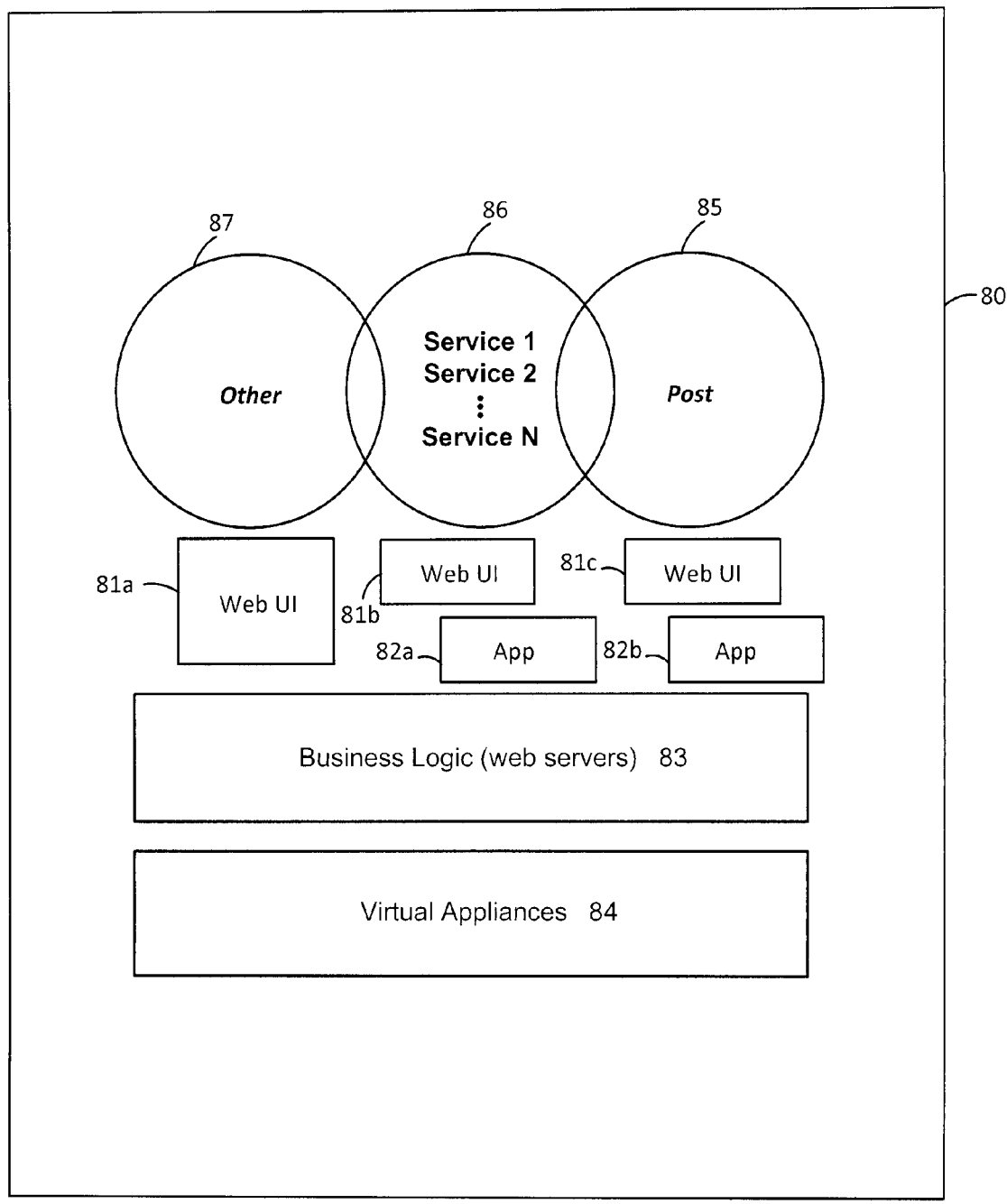

Referring now to FIGS. 9 and 10 there is shown block diagrams 70, 80 of example web services implementations in accordance with example embodiments.

As shown in FIG. 9, web services 72 may connect and interact with a broadcast system 74, post broadcast system 76, and cable/IPTV system 78. Web services 72 may provide a virtual layer between external systems (e.g. service system 74, post processing system 76, cable/IPTV system 78) and the components of system 10. The web services 72 interact with job manager 50, which in turn dispatches and manages one or more cloud engines 36. The job manager 50 may also interact with license server 42 and license pool 44 to comply with license restrictions. The web services 72 may be provided as a cloud computing system. One feature of embodiments described herein is automatic generation web services 72 based on the components that exist in a running engine. The web services 72 can be further filtered through access control by the author/designer of the application.

As shown in FIG. 10, web user interfaces 81 may connect and interact with one or more service system(s) 86, post processing system(s) 85, and other external systems 87 (e.g. cable/IPTV system). Web user interfaces 81 may provide a virtual layer between external systems (e.g. service system(s) 86, post processing system(s) 85, other system(s) 87) and the components of system 10 (referred to as virtual appliances 84). In some embodiments, some web user interfaces 81 may interact with an application 82a to access the components of system 10. In some embodiments, business logic residing on web servers 83 is operable to control interactions between web user interfaces 81 and the components of system 10.

An example embodiment may implement an asset management and publishing system that is responsible for implementing actions including storing, conforming, searching, and publishing large amounts of media data to individual publishing profiles. A publishing profile can be a VOD target, a device, a service, and a network, for example. The asset management and publishing may be implemented as a web application.

Figure 11:
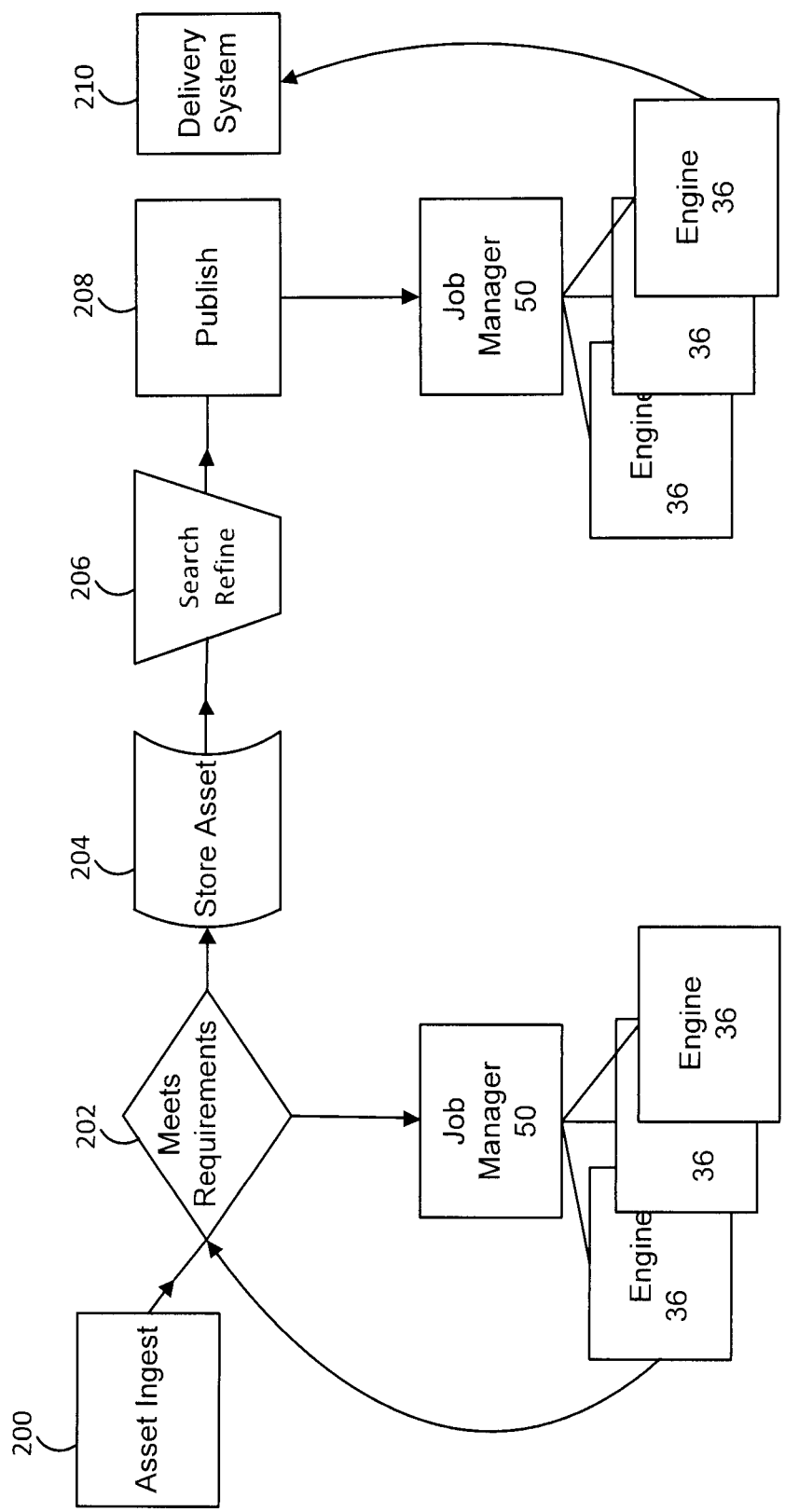
FIGS. 11 and 12 illustrate block diagrams of example implementations of an asset management and publishing system in accordance with example embodiments.
Figure 12:
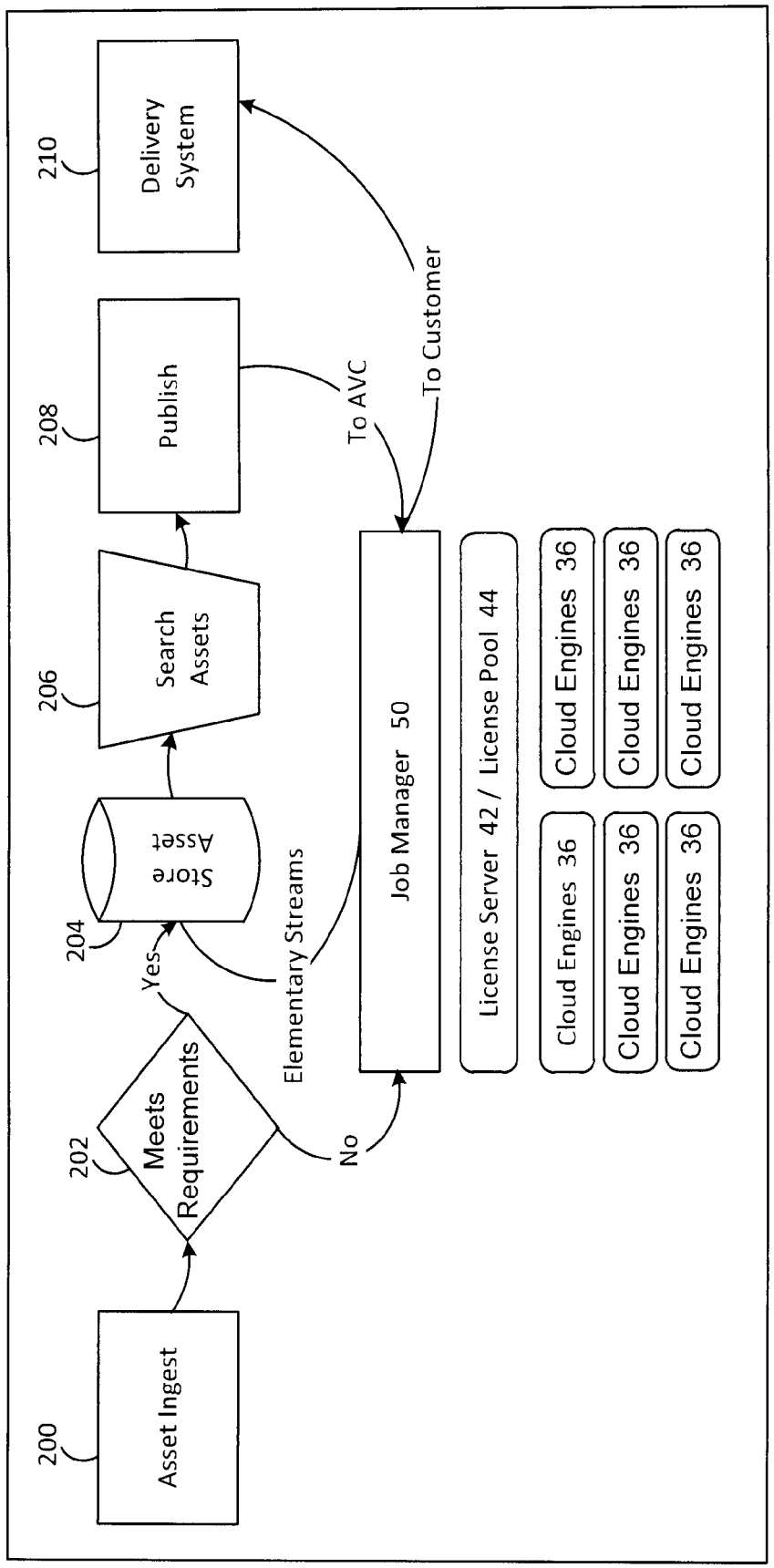

Referring now to FIGS. 11 and 12 there is shown diagrams of example data flows for implementing an asset management and publishing system in accordance with example embodiments. At 200, system 10 is operable to ingest digital media assets (such as input media files). At 202, system 10 is operable to determine whether the digital media assets meet codified requirements and use job manager 50 to dispatch cloud engines 36 for processing and modifying the digital media assets to meet such codified requirements. At 204, system 10 is operable to store digital media assets. In some embodiments, the job manager 50 may be used to manage the storing of the digital media assets. At 206, system 10 is operable to search through the digital media assets for refinement based on search parameters. At 208, system 10 is operable to publish the processed and refined digital media assets to a customer by using the job manager 50 to dispatch corresponding cloud engines 36 for preparing (e.g. advanced video coding) and publishing the digital media assets to specific customers at 210.

Figure 14:
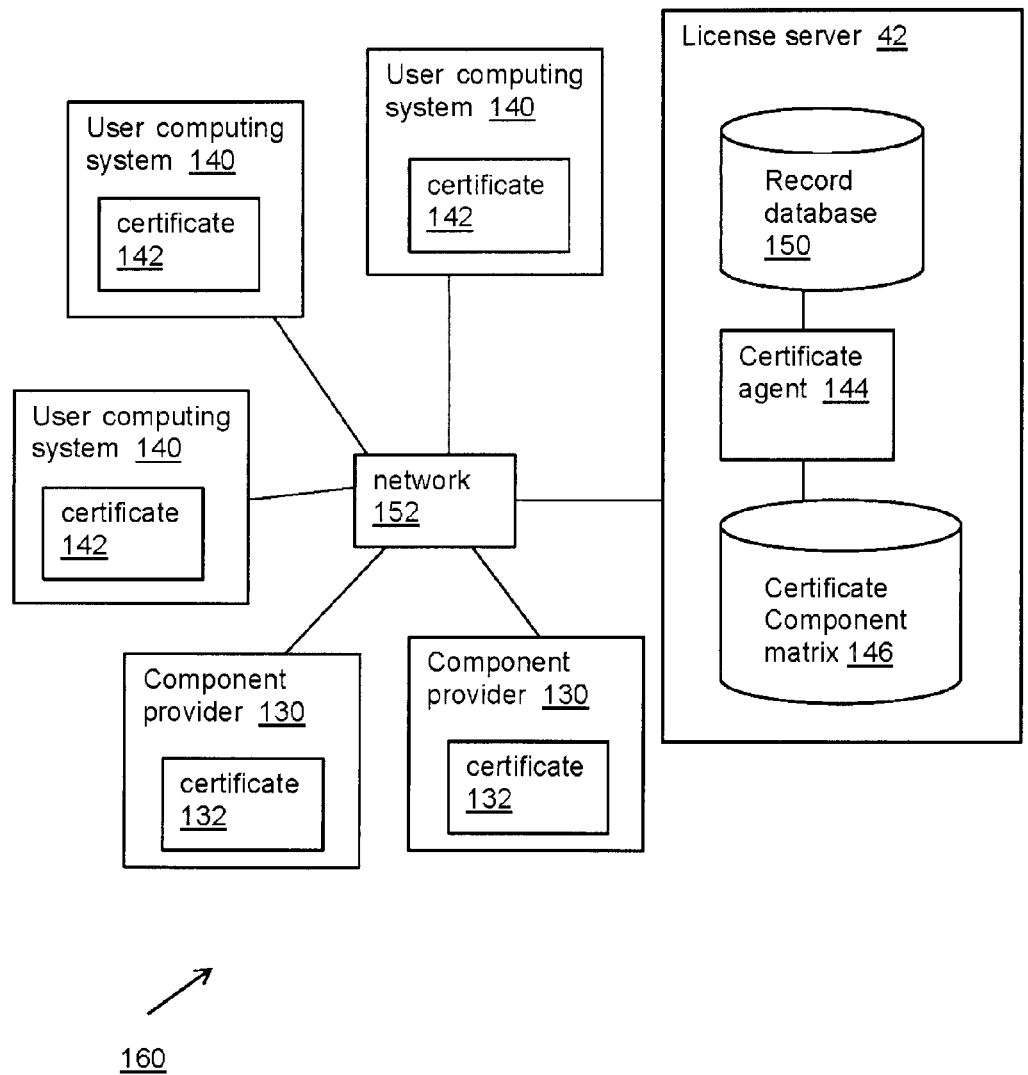
FIG. 14 illustrates a block diagram of an example certification system in accordance with example embodiments.

Referring now to FIG. 14 there is shown a block diagram of an example certification system 160 in accordance with example embodiments. The certification system 160 may certify or sign a solution set, graph 28, component 24, blueprint 28a, and so on (referred to generally herein as components) with digital certificates 142, 132 to indicate acceptance that the particular component will perform or carry out a function as expected, by one or more user computing systems 140 associated with the particular component and one or more component provider systems 130. FIG. 14 illustrates multiple user computing system 140, each associated with different media applications developed and deployed using system 10. FIG. 14 further illustrates multiple component provider systems 130, each having provided resources such as one or more components for use by system 10 or one or more hardware resource used to execute computing applications, for example.

A user computing system 140 may be any networked computing device operated by a user of system 10 including a processor and memory, such as an electronic tablet device, a personal computer, workstation, server, portable computer, mobile device, personal digital assistant, laptop, smart phone, WAP phone, an interactive television, video display terminals, gaming consoles, and portable electronic devices or a combination of these. A networked device is a device capable of communicating with other devices and components of system 10 and certification system 160 through a communication network such as network 152. A network device may couple to the communication network through a wired or wireless connection. Similarly, component provider system 130 maybe any networked computing device operated by a resource provider including a processor and memory Network 152 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The user computing systems 140 and the component provider systems 130 use digital certificates 132, 142 to indicate that they agree that a particular component operates properly. That is, the digital certificates 132, 142 signify acceptance by both the user computing system 140 and the component provider 130 that a particular component satisfies a performance standard. For example, the digital certificate 142 may sign a particular component when a user computing system 140 activates a digital button "I agree" linked to a digital representation of a license agreement. It may be important to track and record acceptance by users and providers to efficiently resolve disputes and to ensure only accepted components are used in the computing applications so that the computing application functions as agreed. It may be important that the functionality performed by the application or the deliverable (what the application creates or transforms) can be tracked, agreed upon, etc. A digital certificate may be an electronic file that identifies an individual or organization and electronically indicates to system 10 that the individual or organization accepts a component. A digital certificate may be issued by system 10 or by a third party certificate issuer. A digital certificate may have security measures to authenticate the individual or organization associated therewith so that the digital certificate is not used fraudulently.

The certification system 160 may extend to multiple user computing systems 140, each with a digital certificate 142 for signing components, blueprints, and so on. The certification system 160 uses digital certificates 132, 142 to create a 'chain of trust' between all aspects of the system 10. Trusted components may create trusted graphs (which may include trusted or untrusted components). A graph may become a trusted graph when signed by multiple user computing systems 140 and provider systems 130 to create trusted exchange of trusted graphs (blueprints) for use within a media application. That is, components may be signed using digital certificates 132, 142, and the signed components may be used to create graphs and blueprints. The graphs and blueprints may also be signed using digital certificates 132, 142. Those signed graphs and blueprints may form part of a computing application, and system 160 may check to ensure all of the computing application components are signed (i.e. accepted by a user and provider) prior to executing the computing application.

As an example, a user computing system 140 may use system 10 to develop a media application involving a particular component and may test and deploy the particular component to ensure it functions properly. Once the user computing system 140 agrees that the particular component satisfies a performance standard (i.e. functions properly) then the user computing system 140 can indicate acceptance using a digital certificate 142 associated with the user computing system 140. The use of a digital certificate to indicate acceptance enables the system 10 to automatically and efficiently track and check the acceptability of media applications and components thereof. The user computing system 140 signifies acceptance by signing the component with the digital certificate 142 associated with the user computing system 140. Similarly, the component provider 130 signifies acceptance by signing the component with a digital certificate 132 associated with the component provider 130.

The license server 42 includes a certificate component matrix 146 which manages records relating to digital certificates 132, 142. In particular, a record links the digital certificates 132, 142 and the accepted resources, such as components, graphs, computing applications, hardware resources used to execute computing applications, and so on. A component may be used in multiple computing applications associated with different user computer systems 140, where each user computer system 140 is associated with a different digital certificate 142. Accordingly, the certificate component matrix 146 may include multiple records associated with the same component, where each record links the component to a different digital certificate 142 associated with a different user computer system 140.

In accordance with some embodiments, the computing application is deployed internally by system 10 or externally by a remote computing system. For example, the remote computing system may be cloud based infrastructure. The remote computing system may be operated by system 10 or may be operated by a third party, for example. A cloud engine 36 or a cloud agent 34 may query the license server 42 to ensure that a component has been signed by both digital certificates 132, 142 before executing a component at runtime as part of a media application associated with the user computing system 140. If the component has not been signed by both digital certificates 132, 142 then the cloud engine 36 or the cloud agent 34 may not execute the component and may provide an error message requesting that the component be signed by the digital certificates 132, 142. The cloud engine 36 or the cloud agent 34 may submit a query that includes both the user computer system 140 associated with the media application and the component. The cloud engine 36 or the cloud agent 34 is operable to verify that the relevant user computing system 140 has accepted the component, as a component may be associated with a different user computing system 140. Further, the cloud engine 36 or the cloud agent 34 is operable to verify that the component provider 130 has accepted the component before deployment.

Further, the license server 42 may include a record database 150 which stores a record or report each time the resource operates successfully, such as when a component successfully executes within the computing application, when a signed hardware resource successfully executes the computing application, and so on. The record establishes that the resource operated successfully (e.g. a component or blueprint executed successfully) in the event of a dispute between the user computing system 140 and the component provider 130. The license server 42 may generate summary of all records associated with a resource for provision to the component provider 130, system 10 or user computing system 140. The summary provides a mechanism to notify the component provider 130 or user computing system 140 that the resource is or is not successfully operating.

Using certification system 160, system 10 is operable to supply some signed components (signed with digital certificates) to guarantee a certain level of functionality. A signed component may establish trust regarding performance and functionality.

For example, a gas company may operate user computing system 140 and may create a computing application (including a blueprint 28a, graph 28, components 24, and so on) which contains some signed components required to perform a particular job, such as a component configured to perform job data mining on a large database of information about potential drill sites, geophysical information for each of these sites, potential risks associated with each site, costs, government limitations, environmental liabilities, and so on. The company may not have the processing resources to perform the computations of the computing application in a required timeframe and may use a remote computing system, such as a cloud based infrastructure for example, to execute the computing application in order to perform the computations. The company may want a guarantee of a performance level in relation to the execution of the computing application by the remote computing system.

The system 10 may engage third parties, such as a component provider system 130 (e.g. vendor of components 24), to provide the remote computing system, such as the cloud based infrastructure. The system 10 and component provider system 130 may be associated with a service level agreement that guarantees performance of the remote computing system provided by the component provider system 130. In order for the gas company operating the user computing system 140 to trust system 10 to run their computing applications there may be a chain of trust established between the component provider system 130, the system 10, and the user computing system 140. Accordingly, there may be more than two digital certificates signing the computing application (or components 24, blueprints 28a, graphs 28 thereof). System 10 may use its own digital certificate to sign to the computing application to guarantee that it functions exactly as the gas company associated with the user computing system 140 requires. In addition, the user computing system 140 may use their digital certificate 142 to sign the computing application and the component provider 130 (which may also be referred to as a service provider as it may provide the cloud computing resources in this example) may use their digital certificate 132 to sign the media application. In effect, instead of offering remote computing system resources (such as raw cloud resources for example), the system 10 may be viewed as offering a "Workflow As A Service" in some examples. The system 10 may not know exactly what job the media application is performing only that it functions in the remote computing system infrastructure properly. The digital certificates 142, 132 provide a chain of trust and acceptance between the parties, a security mechanism and a validating reference point that the parties can feel confident about. Accordingly, in this example, the gas company operating the user computing system 140 signs the application (or blueprint, graph, component thereof) with their digital certificate, the system 10 countersigns the media application with their digital certificate, and the component provider system 130 signs the media application with their digital certificate. The system 10 is operable to only execute the blueprint only if all digital signatures (made by the digital certificates) are valid. Security may be derived from the digital certificates and chain of trust established thereby, as only signed components, blueprints and graphs may be executed by system 10 in some embodiments.

As system 10 generates reports each time the computing application (and blueprints, graphs, and components thereof) successfully execute and those reports are stored by license server 42 in the record database 150. A results summary may be generated and transmitted to the user computing system 140. The chain of trust is maintained so that the gas company operating the user computing system 140 can trust the results of the media application, third party service, etc. and the fact that the data and blueprints have been protected throughout the entire process.

Other potential types of computing applications and contexts include voter registration, integrity management, and vote tally applications.

For example, a computing application may include a blueprint defining a workflow at place at each voting station. The computing application may be a trusted application using trusted (i.e. signed) components, running on a trusted system 10. The user (voter) registers their data and signs the data using their digital certificate and the system 10 adds a user specific certificate to the data. At voting time, the trusted user data is interjected into the trusted workflow and the vote is recorded by system 10. All of the voter stations involved send trusted data into the remote computing system hardware infrastructure executing the computing application where trusted processes are running inside of a trusted environment. The remote computing system solution provider (e.g. component provider system 130) countersigns the computing application implementing the workflow with their digital signature, the data coming back is secure (i.e. signed), the public and government can trust the system 10 because it is secure (i.e. signed), and the results are trusted because of the nature of the system 10. The signing of a component may involve encrypting the component to enhance security.

The use of digital certificates in the described example embodiments differs from a traditional https style of key exchange. For an https system, when a user accesses a website, say a bank, the user can trust the bank because the certificate at the bank website is certified against that particular system. In a remote environment, such as a cloud environment, where the system providing the remote hardware infrastructure may be unknown, and using the described embodiments, the digital certificates may be used to secure the process implemented by the computing applications. The described embodiments may use digital certificates to sign the entire media application, including the individual components and entire workflows implemented by blueprints 28a, and even multiple stages of workflow.

As another example, a media company may sign a media application provided by system 10 as a Workflow As A Service. The media company may operate the user computing system 140 to access system 10 and develop blueprints (workflow) for the media application. System 10 or a third party, such as a media company association, may certify that the workflow (blueprint or media application) is secure when all involved companies sign the blueprint using their digital certificates. The signatures makes all parties feel protected, and ensures with some level of credibility that the media will be secure, the processes will be secure and operate as expected, and the chain of trust is secure.

A process flow associated with the certification system 160 may include the following steps in accordance with an example embodiment.

A user computing system 140 may be provided, via network 140, with access to the system 10, which includes a development framework 12 with a software development kit 20, components 24, data containers 56, pins, graphs 28, blue prints 28a and so on, in order to construct a computing application. The software development kit 20 may be used to define the components 24, data containers 56, pins, graphs 28, blue prints 28a, and solution sets (each generally referred to as components). Each component defines a computing processing mechanism for processing data containers 56 of data at application runtime. Each graph 28 or blueprint 28a comprises a reference to a solution set of components, where the solution set of components is a set of particular versions of components.

The user computing system 140 may be provided, via network 140, with access to the visual design subsystem 30 configured to define and output graphs 28 and blueprints 28a in order to develop computing applications. The visual design subsystem 30 is operable to arrange components into functional blocks and define specific orders of operation for the functional blocks. The user computing system 140 may use the visual design subsystem 30 in order to define solution sets for blueprints 28a and graphs 28 using interface 10.

The user computing system 140 may be provided with a digital certificate 142 associated therewith. The certificate 142 may be provided by system 10, and in particular by license server 42. The certificate 142 may also be provided by a third party certificate provider.

The component provider 130 provides one or more resources, such as components to system 10 for use by the user computing system 140 to develop components and computing applications. Other example resources include signed computing applications and hardware resources to execute computing applications. The component provider 130 is provided with a certificate 132 associated with the provided components. The certificate 132 may be provided by system 10, and in particular license server 32. The certificate 132 may also be provided by a third party certificate provider.

The user computing system 140 may use the component provided by the component provider 130 for one or more of their media applications. As described herein, the user computing system 140 may require a license to use the component, as managed by the license server 42 and the license pool 44.

The user computing system 140 may be provided, via network 140, with access to the deployment subsystem 14 for deploying the computing applications including the component. As described herein, the deployment subsystem 14 includes a repository 32, cloud agent 36, cloud engine 34, and other modules. The computing application may identify graphs 28, blue prints 28a, compound components 26, and components 24, including the component provided by the component provider 130. The repository is configured to store graphs 28, blueprints 28a, and components 24 for loading at application runtime.

The user computing system 140 may use the deployment subsystem 14 to test and deploy the component provided by the component provider 130. If the user computing system 140 is satisfied that the component provided by the component provider 130 functions as expected then the user computing system 140 may accept the performance by signing the component using the digital certificate 142 associated therewith. The license server 42 receives the digital certificate 142 from the user computer system 140 via network 152 and creates a record in the certificate component matrix that links the signed component with the digital certificate 142. Similarly, the component provider 130 may accept the performance by signing the component using the digital certificate 132 associated therewith. The license server 42 receives the digital certificate 132 from the component provider 130 via network 152 and updates the record in the certificate component matrix to also link the signed component with the digital certificate 132.

A cloud engine 36 provides a running environment for the media applications (and the graphs 28 and blueprints 28a thereof) and executes the graphs 28 and blueprints 28a at runtime to instantiate the media application. The cloud agent 34 controls the cloud engine(s) 36. At runtime, the deployment subsystem 14 dynamically constructs and deploys a computing application by sending a request at runtime to the repository 32 for the graphs 28, blueprints 28a, compound components 26, and components 24 identified in the media applications. The deployment subsystem 14, and in particular the cloud engine 36 or the cloud agent 34, is operable to query the license server 42 at runtime to ensure that the component of the computing application has been accepted by both the user computing system 140 and the component provider 130 prior to executing the component and running the computing application. The license server 42 is operable to respond to the query by checking the certificate component matrix 146 for a record that links the component to the user computing system 140 and the component provider 130. If the component has not been accepted an error message may be provided requesting acceptance.

Each time the component of the computing application successfully executes the cloud agent 36 or the cloud engine 36 may provide a record or report of the successful execution to the license server 42.

The job manager 50 is operable to store the record of successful execution in the record database 150 in association with the component, the user computing system 140 or the component provider 130. That way, if a dispute arises in relation to the operation of the component the job manager 50 can provide a copy of the record to establish that the component did or did not execute successfully to resolve the dispute. The license server 42 may know whether or not specific technology resources are in use, may not know whether or how the technology resources used was actually successful.

In accordance with some embodiments, system 10 is operable to provide support for mixed architectures. This may provide increased flexibility as typically a process needs to be compiled for the same architecture binary. For example, a 32 bit CODEC library would typically have to run on a 32 bit context, and typically could not run in a 64 bit context or with a 64 bit library. In accordance with some embodiments, system 10 is operable to develop and deploy an application instance which combines components 24 written for both 32 bit and 64 bit architectures. System 10, and in particular cloud engine 36a, is operable to detect whether a particular media application has been developed using both components 24 for different architectures, such as components 24 for 32 bit architectures and components 24 for 64 bit architectures, for example. If so, system 10 is operable to create a separate process space or instance for each context and handle inter process communications using mapping and a shared memory. For example, the system 10 is operable to create a 32 bit architecture process instance and a 64 bit architecture process instance and manage communications between the process instances.

Figure 16:
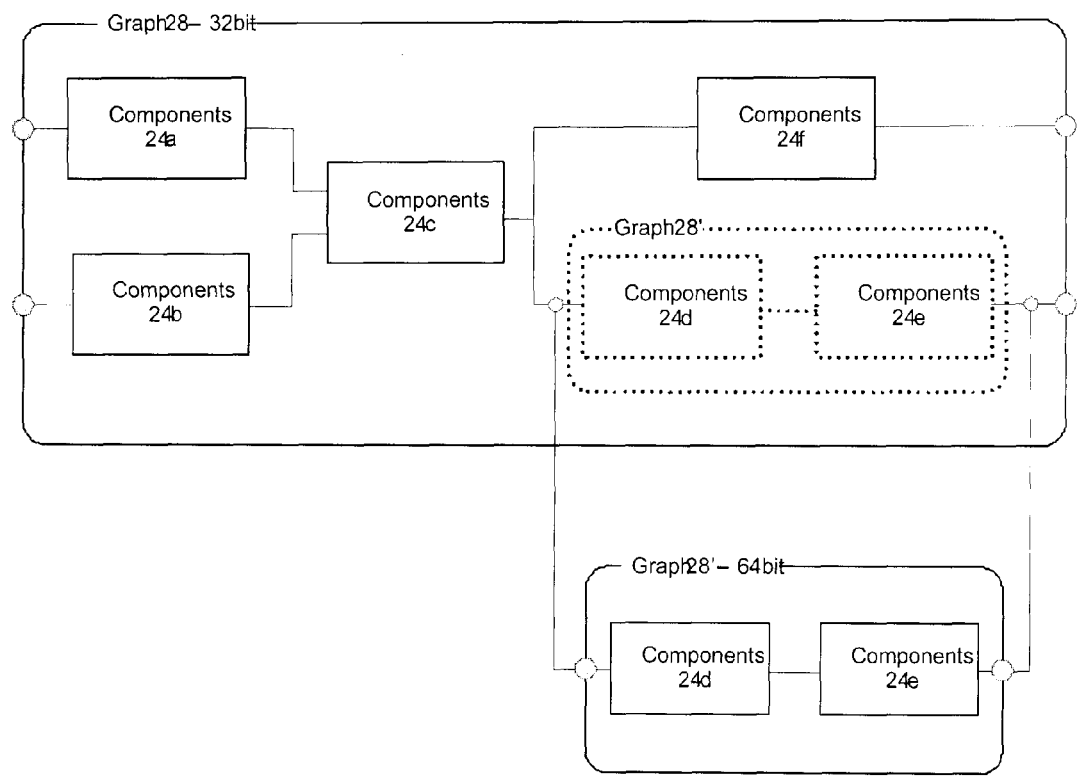
FIG. 16 illustrates a block diagram of partitioning mixed architectures in accordance with example embodiments.

Referring now to FIG. 16 there is shown a block diagram of a mixed architecture in accordance with example embodiments. A graph 28 may contain components 24 developed for different architectures, such as components 24 for 32 bit architectures and components 24 for 64 bit architectures, for example. System 10, and in particular cloud engine 36a, is operable to detect whether a particular graph 28 includes components 24 for different architectures. In this example, graph 28 contains components 24a, 24b, 24c, 24d developed for 32 bit architectures and further contains a subgraph 28' with components developed for 64 bit architectures. System 10 is operable to create a separate process space or instance of graph 28' for the 64 bit context and handle inter process communications using mapping and a shared memory to receive and provide input and output. The subgraph 28' may run out of process for example.

In accordance with some embodiments, system 10 is operable to provide selective scalability, through dynamic provisioning, and deployment based on the individual workload of a component 24, group of components 24, or entire graph 28/blueprint 28a. System 10 is operable to analyze the runtime processing of a blueprint 28a and break down the blueprint 28a into separate running graphs 28 based on derived knowledge of the processing overhead (e.g. bottlenecks) of particular components which exist in a particular workflow. System 10 is further operable to isolate those component(s) 24 and partition the blueprint 28a into multiple graphs (e.g. create new graphs 28) on the fly which can exist on a separate host system (or the same host system) while maintaining the communication and integrity of the original workflow/blueprint 28a. For example, system 10 is operable to use a separate host system with more resources to process to overhead/bottlenecks and manage data flows between. The modular nature of components 24 and graphs 28 enable system 10 to partition a graph 28 into multiple graphs and run them separately on different computing resources.

Figure 15:
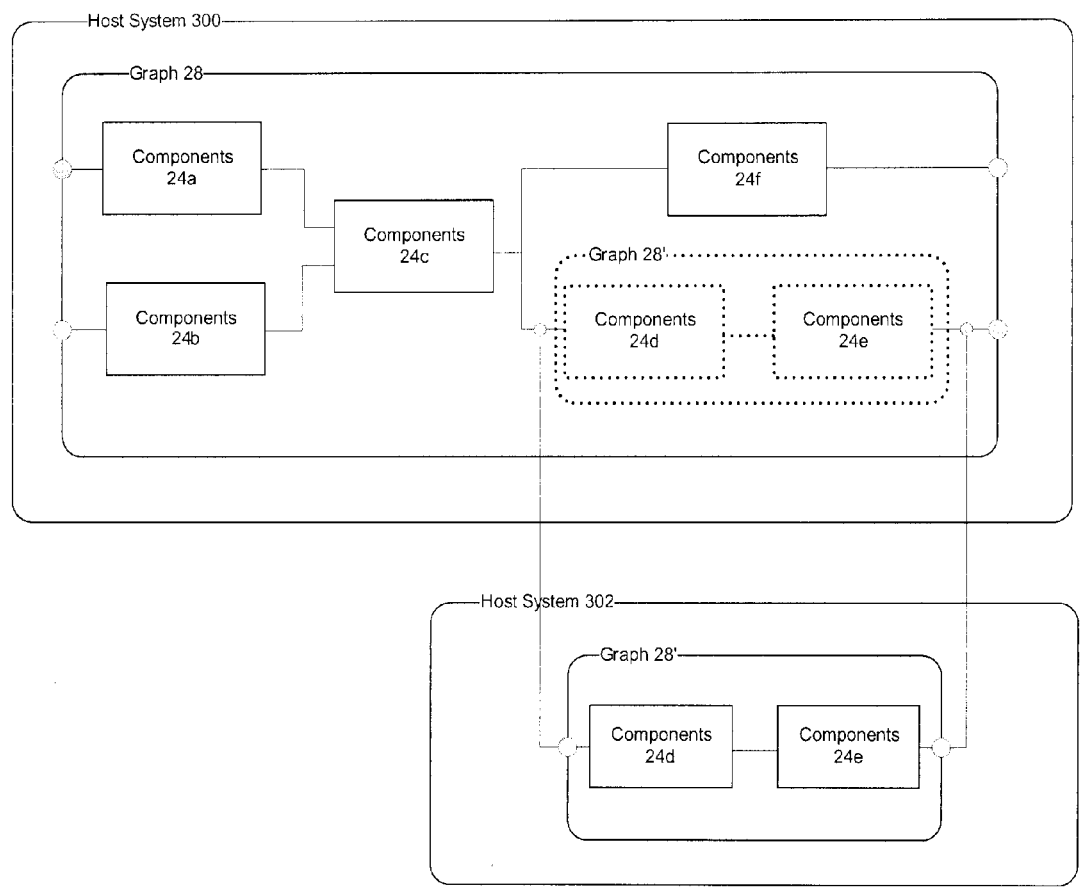
FIG. 15 illustrates a block diagram of dynamic provisioning in accordance with example embodiments.

Referring now to FIG. 15 there is shown a block diagram of a graph 28 partitioned into two graphs 28, where each is run on a separate host system 300, 302. System 10 is operable to identify a processing bottleneck (i.e. graph 28') in a graph 28 running on a host system 300, isolate the components 24 associated with the processing bottleneck, and create a new graph 28' on the fly which can exist on separate host system 302. The separate host system 302 provides additional resources to process graph 28. System 10 is operable to manage communications and data flow (e.g. via a shared memory) between the host systems 300, 302 and graphs 28, 28'.

In accordance with some embodiments, system 10 is operable to provide security through dynamic re-location of graphs 28 and components 24 that make up a particular computing application. The process is similar to as described above in relation to selective scalability except that a graph is partitioned for the purpose of increased security, as opposed to the purpose of isolating a processing bottleneck. For example, security module 46 may interact with license server 42 to determine whether a particular graph 28 for a media application refers to components 24 (or embedded graphs 28) that are signed. If so, system 10 may partition the graph 28 for the media application by isolating the signed components 24 for increased security by obfuscating the original footprint of the media application. The partitioned components may then run on a separate host system (similar to that shown and described in FIG. 15). System 10 is operable to further limit access to the running footprint of a particular blueprint 28a and relocate sections of the blueprint 28a onto different hosts in a dynamic fashion. This may be viewed as 'scrambling' the application footprint at the functional level making it harder to find and compromise. For example, an attacker may focus on one host to monitor and listen, so splitting a process onto multiple hosts may make it more difficult for an attacker to monitor and tamper with the program. The original functionality is maintained as system 10 manages communications and data between the multiple host systems. Security is maintained as the process of creating the new sub-graphs 28 may involve automatic injection of secure messaging components (e.g. encryption). As an extension of this, system 10 is further operable to create multiple instances of each new sub-graph 28 and to randomize the data paths through the running components 24 of the sub-graphs 28. Further, system 10 may be operable to maintain a set of potential host systems and randomize selection of a subset of those host systems on which to run the program, so that the host systems are also randomly selected.

In accordance with some embodiments, system 10 is operable to control access to resources using virtual priority management. That is, system 10 is operable to tune a media application to control priority of processing, parallelization and threading. At runtime, system 10 is operable to manage the execution of a component 24 in such a way as to make it process faster or slower than normal. There may be an imbalance of resource utilization between components 24 in a media application, and system 10 is operable to manage the processing prioritization of a particular component while other components 24 are prioritized independently. For example, if a more important component 24 is running then system 10 is operable to manage, control, manipulate or throttle (i.e. slow down) another component that may be consuming a larger amount of resource until the more important component 24 has completed its processing.

As an illustrative example, the virtual priority management may be implemented using a virtual clock as a mechanism to control priority. A virtual clock is one example and the implementation could be done a number of different ways.

As noted above system 10 is operable to limit resources allocated to a particular component 24. For example this may be limiting component access to a thread pool, memory, or other mechanism. System 10 may throttle the data while not touching anything. An example may be a source component such as a complex signal generator. The signal generator may be the first component in the pipeline and may generate frames faster than they can be consumed but while doing so can also use some amount of CPU. If system 10 decides at runtime to limit the CPU activity the system 10 may simply trigger the signal generator less often. This may not require any manipulation of threads, memory, or source data packets. Another example may be something at the end of the pipeline that is designed to send out notifications or updates but is also blocking while doing so. The component may send email notifications and the act of sending those notifications takes longer than the rest of the pipeline does in actual processing. System 10 may limit the number of notifications by throttling the packets that normally trigger the component to start execution.

In accordance with some embodiment, components 24 may be self-contained and isolated from a dependency point of view. The entire dependency set of a component may be self-contained, being specified and packaged in the component 24 distribution unit (plugin). The component 24 dependencies may also be isolated, referring exclusively to the specific component 24 and version(s) thereof they depend on. Thus the system 10 may be able to realize complex workflows while resolving components dependencies without user intervention. Further the dependency isolation may allow the system 10 to provide distinct behavior while executing different solution sets (blueprints 28a) built with the same components 24, by isolating the different versions of these components 24 and their dependencies.

As described herein, graphs 28 and blueprints 28a are portable and may be packaged to run anywhere there is a cloud agent 34.

In accordance with some embodiments, components 24 and graphs 28 may support promotion of properties and values. For example, if one component 24 is embedded within another component 24, the inner component 24 may promote one or more of its properties to the outer-component 24. A user may pass expressions to components 24 to change/promote properties. That is, properties may be reauthored as they are promoted. Properties may be selectively promoted in that not all properties need to be promoted together. Properties may be promoted without exposing the values, and without exposing the values of the properties that are not promoted.

Embodiments have been described herein in relation to media applications as an illustrative example. The system 10 and methods described herein may be used to develop and deploy other type of software applications and are not limited to media applications, such as natural resource applications, voting applications, and so on.

Embodiments have been described here by way of example only. Various modification and variations may be made to these exemplary embodiments.

We claim:

1. A system for dynamic development of computing applications comprising:
   one or more linked repositories storing blueprints, graphs, and components, each component defining a computing processing mechanism for processing data containers of computing data, each component being associated with one or more versions;
   at least one development processor to develop and output at least one computing application to process at least one input data stream to generate at least one output data stream, the at least one computing application realized by a blueprint of the blueprints in the one or more linked repositories, the blueprint used to instantiate at least one graph of the graphs in the one or more linked repositories at application runtime, the at least one graph representing a workflow of components from the components stored in the one or more linked repositories, the workflow defining an arrangement of the plurality of components and connections between the components using pins; and
   an interface for defining, updating, and testing a solution set of the components of the workflow, the solution set identifying a set of components of the components of the workflow and, for each component of the set of components, a version; and
   the at least one development processor for adding a label to the blueprint realizing the at least one computing application, the label referencing the solution set for loading appropriate versions of the set of components from the one or more linked repositories at application runtime such that when the solution set updates to identify a different version of a component in the set of components, the label references the updated solution set with the different version of the component without requiring modification to the blueprint realizing the at least one computing application.

2. The system of claim 1, wherein a graph delivers functionality defined by the components identified by the graph, and wherein a blueprint connects the functionality to a running environment.

3. The system of claim 1, further comprising a certification system to issue a digital certificate to sign the solution set of components to indicate agreement that the set of components of the solution set satisfy a performance standard.

4. The system of claim 1, further comprising:
   a visual design subsystem for realizing computing applications, wherein the visual design subsystem is operable to arrange components into functional blocks, define specific orders of operation for the functional blocks, and define the connections between the functional blocks using the pins to define the at least one computing application.

5. The system of claim 1, wherein a first component is in a first language and a second component is in a second different language, wherein the first and second components comprise data and are operable to access the memory and data structures, and wherein the system further comprises a translation module operable to translate multiple languages into a common language by translating the first and second component data and how the first and second component are operable to access the memory and the data structures.

6. A method for dynamic development of computing applications, implemented with one or more computer memory units having stored thereon computer program instructions which, when executed perform the method steps, comprising:
  storing blueprints, graphs, and components at one or more linked repositories, each component being associated with one or more versions;
  defining, using each component, a computing processing mechanism for processing data containers of computing data;
  generating, using a development processor, at least one computing application to process at least one input data stream to generate at least one output data stream, the at least one computing application realized by a blueprint of the blueprints in the one or more linked repositories,
  instantiating at least one graph of the graphs in the one or more linked repositories using the blueprint at application runtime, the at least one graph representing a workflow of components from the components stored in the one or more linked repositories, the workflow defining an arrangement of the plurality of components and connections between the components using pins;
  defining, updating, and testing, at an interface, a solution set of the components of the workflow, the solution set identifying a set of components of the components of the workflow and, for each component of the set of components, a version; and
  adding a label to the blueprint realizing the at least one computing application, the label referencing the solution set for loading appropriate versions of the set of components from the one or more linked repositories at application runtime such that when the solution set updates to identify a different version of a component in the set of components, the label references the updated solution set with the different version of the component without requiring modification to the blueprint realizing the at least one computing applications; and
  loading of appropriate versions of the components from the one or more linked repositories using the label referencing the solution set of components.

7. The method of claim 6, further comprising issuing a digital certificate to sign the solution set of components to indicate agreement that the set of components of the solution set satisfy a performance standard.

8. A system for dynamic deployment of computing applications comprising:
  one or more linked repositories storing blueprints, graphs, and components, each component defining a computing processing mechanism for processing data containers of computing data, each component being associated with one or more versions;
  at least one deployment processor for receiving a command to deploy at least one computing application to process at least one input data stream to generate at least one output data stream, the deployment processor realizing the at least one computing application by a blueprint of the blueprints in the one or more linked repositories, the blueprint used to instantiate at least one graph of the graphs in the one or more linked repositories at application runtime, the at least one graph representing a workflow of components from the components stored in the one or more linked repositories, the workflow defining an arrangement of the plurality of components and connections between the components using pins, the blueprint having a label referencing a solution set of the components of the workflow, the solution set identifying a set of components of the components of the workflow and, for each component of the set of components, a version such that when the solution set updates to identify a different version of a component in the set of components, the label references the updated solution set with the different version of the component without requiring modification to the blueprint realizing the at least one computing application;
  the deployment processor configuring one or more cloud agents, and one or more cloud engines, the cloud agent receiving the command to deploy the at least one computing application to process the at least one input data stream and, in response, instantiate the one or more cloud engines on a host system and provide a running environment for the one or more cloud engines; and
  the one or more cloud engines dynamically construct the at least one computing application on the respective host system by realizing requirements of the blueprint of the at least one computing application, the requirements identifying the at least one graph and the components of the workflow and by sending a request to the one or more linked repositories to load the blueprint, the at least one graph, and the set of components on the respective host system using the label to reference the solution set of components to load appropriate versions of the set of components.

9. The system of claim 8, further comprising a license server, wherein the license server dynamically manages licenses and associates licenses with components and graphs, wherein use of components and graphs at application runtime requires the associated license.

10. The system of claim 8, further comprising a job manager, wherein the job manager dispatches blueprints and graphs to cloud agents based on available licenses managed by the license server.

11. The system of claim 8, further comprising a security manager, wherein the security manager provides for secure connections and communications between system components.

12. The system of claim 8, further comprising a job manager configured to provide job and cloud engine dispatch, failover, tracking and reporting.

13. The system of claim 8, further comprising a certification system to issue a digital certificate to sign the solution set of components to indicate agreement that the set of components of the solution set satisfy a performance standard.

14. The system of claim 8, wherein a data container defines a data type and a data object, wherein the data type is metadata describing the data container and the data object maintains raw data.

15. The system of claim 8, wherein the cloud agent is provided to each user system to manage the local resources of the user system, wherein the cloud agents interact with cloud engines to instantiate graphs using blueprints.

16. The system of claim 8, further comprising a normalization module operable to receive input data files and convert and parse the input data files into data containers for processing by a graph.

17. The system of claim 8, further comprising a code signing module operable to digitally sign each component to associate at least one of a developer and license with at least one component.

18. The system of claim 8, further comprising:
- a digital certificate associated with a component provider subsystem, wherein the component provider subsystem provides one or more components of the set of components identified by the solution set;
- a digital certificate associated with a user computing subsystem, wherein the user computing subsystem is associated with the at least one computing application, wherein the computing application involves a component provided by the component provider computing system;
- a license server configured to digitally sign a component of the set of components by linking the component to the digital certificate associated with the user computing subsystem and the digital certificate associated with the component provider subsystem to indicate that the user computing system and the component provider subsystem accept performance of the digitally signed component;

wherein at runtime prior to deploying each component the deployment subsystem queries the license server to determine whether the component is linked to the digital certificate associated with the user computing subsystem and the digital certificate associated with the component provider subsystem.

19. The system of claim 8, wherein the deployment subsystem is further configured to partition a graph into two or more subgraphs and handle interprocess communications between the two or more subgraphs.

20. A method for dynamic deployment of computing applications, implemented with one or more computer memory units having stored thereon computer program instructions which, when executed perform the method steps, comprising:
- storing blueprints, graphs, and components, each component defining a computing processing mechanism for processing data containers of computing data, each component being associated with one or more versions;
- providing at least one deployment processor for receiving a command to deploy at least one computing application to process at least one input data stream to generate at least one output data stream;
- realizing the at least one computing application by a blueprint of the blueprints in the one or more linked repositories;
- instantiating, using the blueprint, at least one graph of the graphs in the one or more linked repositories at application runtime;
- using the at least one graph to represent a workflow of components from the components stored in the one or more linked repositories, the workflow defining an arrangement of the plurality of components and connections between the components using pins;
- defining in the blueprint a label referencing a solution set of the components of the workflow, the solution set identifying a set of components of the components of the workflow and, for each component of the set of components, a version such that when the solution set updates to identify a different version of a component in the set of components, the label references the updated solution set with the different version of the component without requiring modification to the blueprint realizing the at least one computing application;
- configuring, using the deployment processor, one or more cloud agents, and one or more cloud engines;
- receiving, at the cloud agent, the command to deploy the at least one computing application to process the at least one input data stream and, in response, instantiating the one or more cloud engines on a host system and provide a running environment for the one or more cloud engines;
- dynamically constructing, using the one or more cloud engines, the at least one computing application on the respective host system by realizing requirements of the blueprint of the at least one computing application, the requirements identifying the at least one graph and the components of the workflow and by sending a request to the one or more linked repositories to load the blueprint, the at least one graph, and the set of components on the respective host system using the label to reference the solution set of components to load appropriate versions of the set of components; and
- processing the input data stream as a plurality of data containers using the plurality of components to generate the output data stream, the plurality of data containers flowing between the components of the workflow using the pins.

21. The method of claim 20, further comprising:
- providing a digital certificate associated with a component provider subsystem, wherein the component provider subsystem provides one or more components of the set of components identified by the solution set;
- providing a digital certificate associated with a user computing subsystem, wherein the user computing subsystem is associated with the at least one computing application, wherein the computing application involves a component provided by the component provider computing system;
- providing a license server configured to digitally sign a component of the set of components by linking the component to the digital certificate associated with the user computing subsystem and the digital certificate associated with the component provider subsystem to indicate that the user computing system and the component provider subsystem accept performance of the digitally signed component;
- receiving, at a license server, acceptance of the component provided by the component provider subsystem in the computing application associated with user computing system by receiving the digital certificate from the user computing subsystem and the digital certificate from the component provider computing system;
- linking, at the license server, the component provided by the component provider subsystem in the computing application associated with user computing system to the digital certificate from the user computing subsystem and the digital certificate from the component provider computing system; and
- at application runtime prior to deploying each component, querying the license server to determine whether the component is linked to the digital certificate associated with the user computing subsystem and the digital certificate associated with the component provider subsystem.

* * * * *